United States Patent
Hiraishi et al.

(10) Patent No.: US 11,183,693 B2
(45) Date of Patent: Nov. 23, 2021

(54) RESIN COMPOSITION FOR POWER STORAGE DEVICE ELECTRODE

(71) Applicant: Kao Corporation, Tokyo (JP)

(72) Inventors: Atsushi Hiraishi, Wakayama (JP); Kazuo Kuwahara, Wakayama (JP); Kei Takahashi, Wakayama (JP); Kazuo Oki, Wakayama (JP); Hideki Goto, Wakayama (JP)

(73) Assignee: KAO CORPORATION, Tokyo (JP)

(*) Notice: Subject to any disclaimer, the term of this patent is extended or adjusted under 35 U.S.C. 154(b) by 198 days.

(21) Appl. No.: 16/321,708

(22) PCT Filed: Jul. 28, 2017

(86) PCT No.: PCT/JP2017/027530
§ 371 (c)(1),
(2) Date: Jan. 29, 2019

(87) PCT Pub. No.: WO2018/021552
PCT Pub. Date: Feb. 1, 2018

(65) Prior Publication Data
US 2020/0381734 A1 Dec. 3, 2020

(30) Foreign Application Priority Data
Jul. 29, 2016 (JP) .............................. JP2016-149538

(51) Int. Cl.
*H01M 4/62* (2006.01)
*C08F 2/22* (2006.01)
(Continued)

(52) U.S. Cl.
CPC ............... *H01M 4/622* (2013.01); *C08F 2/22* (2013.01); *C08F 220/06* (2013.01);
(Continued)

(58) Field of Classification Search
CPC ........ H01M 4/62; H01M 4/622; H01M 4/667; C08F 220/06; C08F 220/18; C08F 220/56
See application file for complete search history.

(56) References Cited

U.S. PATENT DOCUMENTS 9,543,584 B2 * 1/2017 Kim ..................... C08F 212/32
9,799,885 B2 * 10/2017 Kang .................... C08F 220/18
(Continued)

FOREIGN PATENT DOCUMENTS

| CN | 102227832 A | 10/2011 |
| CN | 103289617 A | 9/2013 |

(Continued)

OTHER PUBLICATIONS

Machine translation of WO 2010/113940 (no date).*
(Continued)

*Primary Examiner* — Amanda C. Walke
(74) *Attorney, Agent, or Firm* — Birch, Stewart, Kolasch & Birch, LLP

(57) ABSTRACT

One aspect provides a resin composition that is used for an electrode of a power storage device and that has excellent ion permeability while ensuring good binding properties with an electrode. One aspect of the present disclosure relates to a resin composition for an electrode of a power storage device. The resin composition contains polymer particles. The polymer particles have ion permeability. A rate of change in elasticity of the polymer particles before and after treatment with an electrolyte solution [(modulus of elasticity after treatment)/(modulus of elasticity before treatment)] is 30% or less.

11 Claims, 1 Drawing Sheet

(51) Int. Cl.
  *C08F 220/06* (2006.01)
  *C08F 220/18* (2006.01)
  *C08F 220/56* (2006.01)
  *H01M 4/66* (2006.01)
  *H01M 4/02* (2006.01)

(52) U.S. Cl.
  CPC .......... *C08F 220/18* (2013.01); *C08F 220/56* (2013.01); *H01M 4/667* (2013.01); *H01M 2004/027* (2013.01); *H01M 2004/028* (2013.01)

(56) References Cited

U.S. PATENT DOCUMENTS

| | | | |
|---|---|---|---|
| 9,887,423 B2* | 2/2018 | Kang | C09D 133/10 |
| 2011/0176255 A1 | 7/2011 | Sasaki et al. | |
| 2015/0187516 A1 | 7/2015 | Miyauchi et al. | |
| 2015/0284558 A1 | 10/2015 | Mochida et al. | |
| 2015/0303463 A1 | 10/2015 | Sasaki | |
| 2017/0018778 A1 | 1/2017 | Nagai | |
| 2017/0069913 A1* | 3/2017 | Yano | C08F 220/28 |
| 2017/0133667 A1 | 5/2017 | Mihara et al. | |
| 2018/0102542 A1* | 4/2018 | Matsuzaki | H01M 10/0566 |
| 2018/0254520 A1 | 9/2018 | Maeda | |
| 2019/0006677 A1* | 1/2019 | Matsuo | H01M 4/622 |
| 2019/0044148 A1* | 2/2019 | Yamamoto | C08F 236/08 |
| 2020/0295372 A1* | 9/2020 | Adachi | C08F 220/06 |

FOREIGN PATENT DOCUMENTS

| | | | | |
|---|---|---|---|---|
| CN | 104205442 A | 12/2014 | | |
| CN | 104471762 A | 3/2015 | | |
| CN | 104520342 A | 4/2015 | | |
| CN | 105018001 A | 11/2015 | | |
| CN | 105576284 A | 5/2016 | | |
| CN | 105659419 A | 6/2016 | | |
| JP | 2006-008561 A | 1/2006 | | |
| JP | 2008-537841 A | 9/2008 | | |
| JP | 2009-224239 A | 10/2009 | | |
| JP | 2010-278125 A | 12/2010 | | |
| JP | 2011-49231 A | 3/2011 | | |
| JP | 2012-151108 A | 8/2012 | | |
| JP | 2013-004229 A | 1/2013 | | |
| JP | 2014-79209 A | 3/2014 | | |
| JP | 2014-123495 A | 7/2014 | | |
| JP | 2015-072788 A | 4/2015 | | |
| WO | WO 2006/107173 A1 | 10/2006 | | |
| WO | WO-2010113940 A1 * | 10/2010 | ........... | H01M 4/622 |
| WO | WO 2014/073647 A1 | 5/2014 | | |
| WO | WO 2014/185381 A1 | 11/2014 | | |
| WO | WO 2014/192652 A1 | 12/2014 | | |
| WO | WO 2016/009936 A1 | 1/2016 | | |
| WO | WO 2017/047379 A1 | 3/2017 | | |

OTHER PUBLICATIONS

Machine translation of JP 2014/123495 (no date).*
Machine translation of JP 2010/278125 (no date).*
International Search Report (PCT/ISA/210) issued in PCT/JP2017/027530, dated Oct. 31, 2017.
Extended European Search Report for European Application No. 17834554.2, dated Nov. 13, 2019.
Japanese Office Action, dated May 16, 2021, for Japanese Application No. 2017-146958, with an English machine translation.
Chinese Office Action and Search Report for Chinese Application No. 201780047222.0, dated Aug. 13, 2021, with English translation of the Office Action.

* cited by examiner

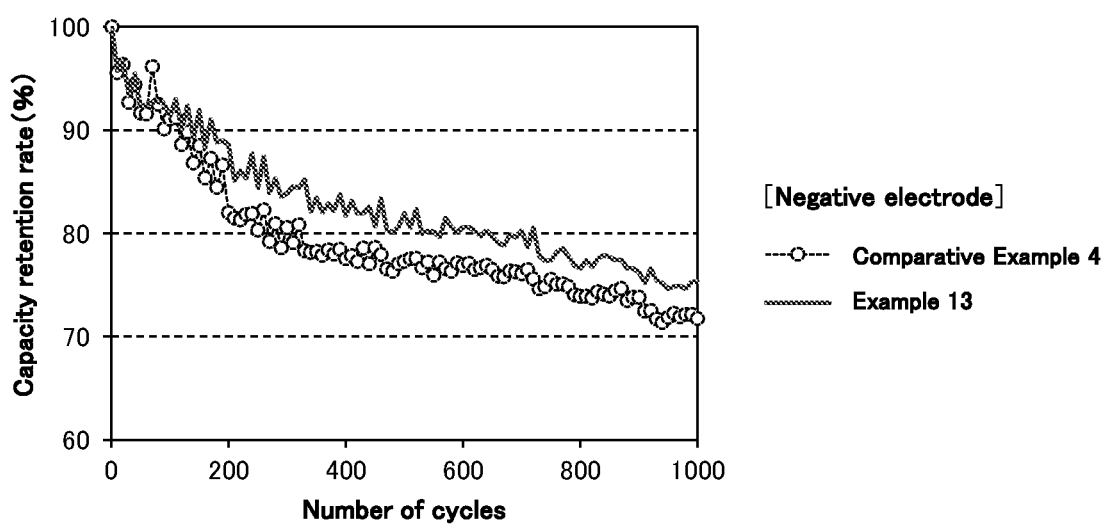

RESIN COMPOSITION FOR POWER STORAGE DEVICE ELECTRODE

TECHNICAL FIELD

The present invention relates to a resin composition for an electrode of a power storage device.

BACKGROUND ART

The demand for power storage devices is steadily increasing with, e.g., the recent spread of smartphones, the zero-emission controls in the automobile market, and the expanded use of natural energy. Thus, power storage devices are required to have a small size, a light weight, and a large capacity. In addition, power storage devices with higher output and higher recording density are becoming more and more necessary for automobiles or the like. To meet these requirements, the development of power storage devices such as a lithium ion secondary battery, an alkali ion secondary battery, an electric double-layer capacitor, and a lithium ion capacitor has advanced considerably.

The power storage devices generally include an electrode composed of a metal foil and a mixture layer containing, e.g., an active material. The mixture layer is applied to the metal foil. In order to prevent the mixture layer from peeling off, a resin (binder) for an electrode of a power storage device is added to the mixture layer. However, since the binder itself has poor insulation and poor ion permeability, the addition of the binder impairs the capacity and input-output characteristics of a battery. It is known that ion conductivity is significantly reduced particularly at low temperatures or when an electrode plate is compressed. This may lead to poor durability and low capacity.

To solve the above problems, a binder that can improve battery characteristics has been proposed (see, e.g., Patent Documents 1, 2, and 3).

Patent Document 1 discloses a binder for an electrode of a lithium secondary battery. The binder includes a resin obtained by copolymerization of a monomer mixture that contains 0.01 to 30% by mass of a carboxyl group containing monomer (a-1), 20 to 60% by mass of acrylonitrile (a-2), and a copolymerizable monomer (a-3) as a reminder.

Patent Document 2 discloses a binder that includes resin particles. The resin particles are obtained by polymerization of (a) 1 to 80 parts by weight of a (meth)acrylic acid ester monomer, (b) 1 to 20 parts by weight of an unsaturated carboxylic acid monomer, and (c) 0.001 to 40 parts by weight of a vinyl monomer with respect to 100 parts by weight of binder resin.

Patent Document 3 discloses a binder for an electrode. The binder includes two types of macromolecules with different elastic moduli.

PRIOR ART DOCUMENTS

Patent Documents

Patent Document 1: JP 2013-4229 A
Patent Document 2: JP 2008-537841 A
Patent Document 3: JP 2009-224239 A

DISCLOSURE OF INVENTION

Problem to be Solved by the Invention

However, the conventional resin (binder) for an electrode of a power storage device, as proposed in Patent Documents 1 to 3, has high solubility in an electrolyte solution or poor compatibility with an electrolyte solution. The electrode including the conventional resin is not sufficiently effective in reducing the ionic resistance of a battery because the conventional resin is not permeable to alkali ions contained in the electrolyte solution. Accordingly, the battery characteristics are insufficient when the electrode uses the conventional resin for an electrode of a power storage device.

The reason for insufficient battery characteristics with the electrode including the conventional resin (binder) may be due to the ionic resistance. Thus, the resin for an electrode of a power storage device has been required to have new properties to improve the battery characteristics.

In view of the above, one or more embodiments of the present disclosure provide a resin composition that is used for an electrode of a power storage device and that has excellent ion permeability or can improve battery characteristics while ensuring good binding properties with an electrode.

Means for Solving Problem

One aspect of the present disclosure relates to a resin composition for an electrode of a power storage device. The resin composition contains polymer particles. The polymer particles have ion permeability. A rate of change in elasticity of the polymer particles before and after treatment with an electrolyte solution [(modulus of elasticity after treatment)/(modulus of elasticity before treatment)] is 30% or less.

Another aspect of the present disclosure relates to a method for producing a resin composition for an electrode of a power storage device. The resin composition contains polymer particles. The method includes a polymerization step of polymerizing a monomer mixture containing a monomer (A-2) and a monomer (B-2) to form polymer particles. The monomer (A-2) is a compound expressed by the following formula (I). The monomer (B-2) is at least one compound selected from a compound expressed by the following formula (II), a compound expressed by the following formula (III), and unsaturated dibasic acid. An amount of the monomer (A-2) used in the polymerization step is 50% by mass or more and 99.9% by mass or less with respect to a total amount of monomers. An amount of the monomer (B-2) used in the polymerization step is 0.1% by mass or more and 20% by mass or less with respect to the total amount of monomers. An amount of a surfactant used in the polymerization step is 0.05% by mass or less with respect to the total amount of monomers.

(I)

[In the formula (I), $R^1$ represents a hydrogen atom or a methyl group; $R^2$ represents at least one selected from a linear or branched alkyl group having 1 to 6 carbon atoms and —$CH_2OR^3$; $R^3$ represents a linear or branched alkyl group having 4 to 6 carbon atoms; and X represents —O— or —NH—.]

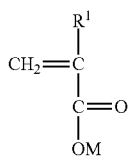

[In the formula (II), $R^1$ represents a hydrogen atom or a methyl group; and M represents a hydrogen atom or a cation.]

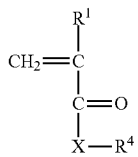

[In the formula (III), $R^1$ represents a hydrogen atom or a methyl group; X represents —O— or —NH—; $R^4$ represents at least one selected from —$(CH_2)_n$OH, —$R^5SO_3$M, —$R^6N(R^7)(R^8)$, and —$R^6N^+(R^7)(R^8)(R^9).Y^-$; n represents 1 or more and 4 or less; $R^5$ represents a linear or branched alkylene group having 1 to 5 carbon atoms; M represents a hydrogen atom or a cation; $R^6$ represents a linear or branched alkylene group having 1 to 4 carbon atoms; $R^7$ and $R^8$ are the same or different and represent a linear or branched alkyl group having 1 to 3 carbon atoms; $R^9$ represents a linear or branched alkyl group having 1 to 3 carbon atoms; and $Y^-$ represents an anion.]

Another aspect of the present disclosure relates to an electrode for a power storage device. The electrode includes a current collector and a mixture layer provided on the current collector. The mixture layer includes an active material and the resin composition for an electrode of a power storage device of the present disclosure.

Effects of the Invention

One or more embodiments of the present disclosure can provide a resin composition that is used for an electrode of a power storage device and that has excellent ion permeability while ensuring good binding properties with an electrode.

Further, one or more embodiments of the present disclosure can provide a method for producing a resin composition that is used for an electrode of a power storage device and that can improve battery characteristics while ensuring good binding properties with an electrode.

BRIEF DESCRIPTION OF DRAWINGS

FIG. 1 shows the results of the charge-discharge cycle characteristics of lithium ion secondary batteries produced by using negative electrodes of Example 13 and Comparative Example 4.

DESCRIPTION OF THE INVENTION

In one or more embodiments, the present disclosure is based on the findings that a binder for an electrode of a power storage device has excellent ion permeability while ensuring good binding properties when the binder contains polymer particles having ion permeability, and a rate of change in elasticity of the polymer particles before and after treatment with an electrolyte solution [(modulus of elasticity after treatment)/(modulus of elasticity before treatment)] is within a predetermined range.

One aspect of the present disclosure relates to a resin composition for an electrode of a power storage device (also referred to as a "resin composition of the present disclosure" in the following). The resin composition of the present disclosure contains polymer particles. The polymer particles have ion permeability. A rate of change in elasticity of the polymer particles before and after treatment with an electrolyte solution [(modulus of elasticity after treatment)/(modulus of elasticity before treatment)] is 30% or less. The resin composition of the present disclosure can have excellent ion permeability while ensuring good binding properties with an electrode.

In one or more embodiments, the resin composition of the present disclosure has excellent ion permeability while ensuring good binding properties with an electrode. The details of the mechanism for exhibiting this effect are still not clear, but may be assumed as follows.

In one or more embodiments, the resin composition of the present disclosure contains polymer particles with a predetermined rate of change in elasticity. This may impart good binding properties to the resin composition as a binder, and may also reduce the elasticity significantly so as to ensure an ion flow path between electrodes. Therefore, it may be possible to suppress the inhibition of ion migration even if the mobility such as charge transfer is reduced at low temperatures. However, this is only an assumption and the present disclosure is not limited to the above mechanism.

Further, in one or more embodiments, the present disclosure is based on the findings that a resin composition for an electrode of a power storage device can improve battery characteristics while ensuring good binding properties with an electrode when the resin composition contains predetermined polymer particles, and the surface tension of the resin composition is controlled to a predetermined level.

Another aspect of the present disclosure relates to a resin composition for an electrode of a power storage device (also referred to as a "resin composition of the present disclosure" in the following). The resin composition of the present disclosure contains polymer particles. The polymer particles contain a constitutional unit (A-2) derived from a compound expressed by the formula (I) and a constitutional unit (B-2) derived from at least one compound selected from a compound expressed by the formula (II), a compound expressed by the formula (III), and unsaturated dibasic acid. A content of the constitutional unit (A-2) in all constitutional units of the polymer particles is 50% by mass or more and 99.9% by mass or less. A content of the constitutional unit (B-2) in all constitutional units of the polymer particles is 0.1% by mass or more and 20% by mass or less. A surface tension of the resin composition is 55 mN/m or more. The resin composition of the present disclosure can improve battery characteristics while ensuring good binding properties with an electrode. Moreover, the use of the resin composition of the present disclosure in an electrode for a power storage device can improve battery characteristics.

In one or more embodiments, the resin composition of the present disclosure can improve battery characteristics while ensuring good binding properties with an electrode. The details of the mechanism for exhibiting this effect are still not clear, but may be assumed as follows.

In one or more embodiments, the resin composition of the present disclosure contains predetermined polymer particles and has a surface tension at a predetermined level or higher. This may impart good binding properties to the resin composition as a binder, and may also provide the resin composition with excellent compatibility with an electrolyte solution used in a power storage device. Therefore, the resin composition can avoid inhibiting the migration of alkali ions such as lithium ions contained in the electrolyte solution. Accordingly, a battery produced by using the resin composition of the present disclosure may reduce the internal resistance and improve the battery characteristics. However, this is only an assumption and the present disclosure is not limited to the above mechanism.

Hereinafter, the resin composition of the present disclosure will be described in detail.

Polymer Particles

In one or more embodiments, the resin composition of the present disclosure contains polymer particles having ion permeability (also referred to as "polymer particles of the present disclosure" in the following). The ion permeability can be evaluated, e.g., with a measurement method using inductively coupled plasma mass spectrometry (ICP-MS). Specifically, the ion permeability may be evaluated with a method as described in Examples.

In one or more embodiments, a rate of change in elasticity of the polymer particles of the present disclosure before and after treatment with an electrolyte solution [(modulus of elasticity after treatment)/(modulus of elasticity before treatment)] is 30% or less, preferably 10% or less, and more preferably 3% or less from the viewpoint of the ion permeability at low temperatures. Furthermore, the rate of change in elasticity of the polymer particles is preferably 0.01% or more, and more preferably 0.05% or more from the viewpoint of the stability of the binder. The modulus of elasticity and the rate of change in elasticity may be measured, e.g., with a method as described in Examples. If the polymer is e.g., an acrylate polymer, the modulus of elasticity may be adjusted by increasing the amount of monomers that have many lower alkyl groups or by increasing the molar ratio of acrylate ester or acrylamide.

In the present disclosure, the electrolyte solution may be used for a power storage device and have, e.g., a solubility parameter (sp) of 8.0 $(cal/cm^3)^{1/2}$ or more and 11.5 $(cal/cm^3)^{1/2}$ or less. Examples of the electrolyte solution generally include ionic liquids and a solution obtained by dissolving electrolyte in an organic solvent.

The organic solvent may be, e.g., esters. Specifically, the organic solvent may be one, two, or a combination of three or more selected from the following: cyclic carbonic acid esters such as ethylene carbonate (EC, sp: 11.0) and propylene carbonate (PC, sp: 10.19); chain carbonic acid esters such as dimethyl carbonate (DMC, sp: 8.51), ethyl methyl carbonate (EMC, sp: 8.52), and diethyl carbonate (DEC, sp: 8.53); chain carboxylic acid esters such as ethyl propionate (sp: 8.72); and cyclic lactones. In particular, from the viewpoint of stability in oxidation-reduction, mixed solvents of cyclic carbonic acid esters and chain carbonic acid esters are preferred. Specific examples of the mixed solvents include the following: a mixed solvent (sp: 10.12) containing EC and DEC at a volume ratio of 1/1; a mixed solvent (sp: 9.61) containing EC and DEC at a volume ratio of 3/7; a mixed solvent (sp: 9.50) containing EC and MEC at a volume ratio of 3/7; a mixed solvent (sp: 9.18) containing PC and DEC at a volume ratio of 2/8; a mixed solvent (sp: 9.58) containing EC, DEC, and DMC at a volume ratio of 1/1/1; and a mixed solvent (sp: 9.65) containing EC, DEC, and EMC at a volume ratio of 1/1/1.

The electrolyte is an ionic compound that is dissolved in an organic solvent and has the function of conducting electricity. The electrolyte may be, e.g., lithium salts such as $LiClO_4$, $LiPF_6$, $LiBF_4$, $LiCF_3SO_3$, $LiN(CF_3SO_2)_2$, $LiCF_3CO_2$, LiCl, LiBr, and LiSCN. These lithium salts may be used individually or in combinations of two or more. In particular, $LiPF_6$ and $LiBF_4$ are preferred.

Examples of the ionic liquids include the following: alkyl salts of bis(fluorosulfonyl)amide (FSA) and bis(trifluoromethanesulfonyl)amide (TFSA); N-methyl propyl pyrrolidinium (P13); diethyl methyl methoxyethyl ammonium (DEME); and triglyme (G3).

In one or more embodiments, the polymer particles of the present disclosure preferably have low solubility so that they are stable in the electrolyte solution. In one of more embodiments, from the viewpoint of stability in the electrolyte solution, the solubility of the polymer particles in the electrolyte solution is preferably less than 3% by mass, more preferably 1.5% by mass or less, even more preferably 1% by mass or less, and further preferably less than 1% by mass. The solubility may be measured, e.g., with a method as described in Examples.

In one or more embodiments, from the viewpoint of compatibility with the electrolyte solution, the solubility parameter (sp) of the polymer particles of the present disclosure is preferably 9.0 $(cal/cm^3)^{1/2}$ or more, more preferably 9.3 $(cal/cm^3)^{1/2}$ or more, and further preferably 9.5 $(cal/cm^3)^{1/2}$ or more. From the same viewpoint, the solubility parameter (sp) of the polymer particles is preferably 11.0 $(cal/cm^3)^{1/2}$ or less, more preferably 10.7 $(cal/cm^3)^{1/2}$ or less, and further preferably 10.5 $(cal/cm^3)^{1/2}$ or less. In the present disclosure, the solubility parameter (sp) is calculated with a Fedors method [R. F. Fedors, Polym. Eng. Sci., 14, 147 (1974)]. When the polymer particles of the present disclosure have a solubility parameter within the above range, the compatibility of the resin composition of the present disclosure with the electrolyte solution is improved, and thus the electrolyte solution can smoothly pass through the resin composition. If the polymer is, e.g., an acrylate polymer, the solubility parameter (sp) may be adjusted by taking into account the ratio of the hydrophilic functional group to the hydrophobic functional group in raw materials for monomers and the order of polarity of these functional groups.

In one or more embodiments, from the viewpoint of compatibility with the electrolyte solution, a difference in the solubility parameter Δ sp between the polymer particles of the present disclosure and the electrolyte solution is preferably 1.0 $(cal/cm^3)^{1/2}$ or less, more preferably 0.9 $(cal/cm^3)^{1/2}$ or less, even more preferably 0.8 $(cal/cm^3)^{1/2}$ or less, and further preferably 0.7 $(cal/cm^3)^{1/2}$ or less. Controlling the Δ sp value in a predetermined range can facilitate the permeation of the electrolyte solution.

In one or more embodiments, from the viewpoint of binding properties and ion permeability, the glass transition temperature (Tg) of the polymer particles of the present disclosure is preferably within a predetermined range. In one or more embodiments, the Tg of the polymer particles is preferably a predetermined value or less so as to ensure the binding properties with an electrode and not to inhibit the permeation of the electrolyte solution. Specifically, the Tg of the polymer particles is preferably 60° C. or less, and more preferably 30° C. or less. In one or more embodiments, from the viewpoint of stability in the electrolyte solution, the Tg of the polymer particles is preferably a predetermined value or more. Specifically, the Tg of the polymer particles is preferably −50° C. or more, and more preferably −30° C. or more. This is because the permeation of the electrolyte solution and the binding strength may depend on a change in the form of the binder with temperature of the electrolyte solution due to a difference in the Tg of the polymer particles themselves. The Tg can be adjusted by appropriately selecting the monomer composition ratio and the molecular weight based on the Tg of various known homopolymers. The glass transition temperature (Tg) may be measured, e.g., with a method as described in Examples.

The polymer particles of the present disclosure may include, e.g., a polymer containing a constitutional unit derived from at least one monofunctional monomer selected from monofunctional (meth)acrylate, monofunctional (meth)acrylamide, a monofunctional monomer having an acidic group, a styrene monofunctional monomer, and a monofunctional monomer having a nitrogen-containing heterocyclic ring. In the preset disclosure, the monofunctional monomer is a monomer having one unsaturated bond. These monofunctional monomers may be used individually or in combinations of two or more. In the present disclosure, (meth)acrylate means methacrylate or acrylate, and (meth)acrylamide means methacrylamide or acrylamide.

The monofunctional (meth)acrylate may be, e.g., ester (meth)acrylate. Specifically, the monofunctional (meth)acrylate may be one or a combination of two or more selected from the following: alkyl ester (meth)acrylate; ester (meth)acrylate containing a cycloalkyl group; ester (meth)acrylate containing an aromatic group; ester (meth)acrylate containing a hydroxyl group; and ester (meth)acrylate containing a nitrogen atom.

Examples of the alkyl ester (meth)acrylate include the following: methyl (meth)acrylate; ethyl (meth)acrylate; n-propyl (meth)acrylate; isopropyl (meth)acrylate; n-butyl (meth)acrylate; isobutyl (meth)acrylate; sec-butyl (meth)acrylate; tert-butyl (meth)acrylate; n-pentyl (meth)acrylate; n-hexyl (meth)acrylate; octyl (meth)acrylate; 2-ethylhexyl (meth)acrylate; lauryl (meth)acrylate; stearyl (meth)acrylate; isostearyl (meth)acrylate; and behenyl (meth)acrylate.

Examples of the ester (meth)acrylate containing a cycloalkyl group include cyclohexyl (meth)acrylate, isobornyl (meth)acrylate, and dicyclopentanyl (meth)acrylate.

Examples of the ester (meth)acrylate containing an aromatic group include benzyl (meth)acrylate.

Examples of the ester (meth)acrylate containing a hydroxyl group include hydroxyalkyl (meth)acrylate, alkoxy polyalkylene glycol (meth)acrylate, and polyalkylene glycol (meth)acrylate.

The ester (meth)acrylate containing a nitrogen atom may be, e.g., ester (meth)acrylate containing an amino group. Specific examples of the ester (meth)acrylate containing a nitrogen atom include N,N'-dimethylaminoethyl (meth)acrylate and N,N'-diethylaminoethyl (meth)acrylate.

Examples of the monofunctional (meth)acrylamide include (meth)acrylamide, N, N'-dimethylacrylamide, and N-isopropylacrylamide.

The monofunctional monomer having an acidic group may be, e.g., a monofunctional monomer having at least one acidic group selected from a carboxylic acid group, a phosphate group, a sulfate group, and a sulfonic acid group. Examples of the monofunctional monomer having a carboxylic acid group include (meth)acrylic acid and unsaturated dibasic acid. Examples of the monofunctional monomer having a sulfonic acid group include styrenesulfonic acid and sodium styrene sulfonate.

Examples of the styrene monofunctional monomer include styrene.

Examples of the monofunctional monomer having a nitrogen-containing heterocyclic ring include vinylpyridine and vinylpyrrolidone.

From the viewpoint of ease of synthesis, binding properties, and ion permeability, an embodiment of the polymer particles of the present disclosure may be preferably a polymer containing a constitutional unit (also referred to as a "constitutional unit (A-1)" in the following) derived from monofunctional (meth)acrylate (also referred to as a "monomer (A-1)" in the following).

From the same viewpoint, another embodiment of the polymer particles of the present disclosure may be preferably a polymer containing a constitutional unit (A-1) derived from a monomer (A-1) of monofunctional (meth)acrylate and a constitutional unit (also referred to as a "constitutional unit (B-1)" in the following) derived from a monofunctional monomer having an acidic group (also referred to as a "monomer (B-1)" in the following). Each of the monomers (A-1) and (B-1) may be used individually or in combinations of two or more.

From the viewpoint of ease of synthesis, compatibility with the electrolyte solution, and the physical properties of the binder, yet another embodiment of the polymer particles of the present disclosure may be preferably a polymer containing a constitutional unit (A-2) derived from at least one monofunctional monomer (also referred to as a "monomer (A-2)" in the following) selected from monofunctional (meth)acrylate and monofunctional (meth)acrylamide and a constitutional unit (B-2) derived from at least one monofunctional monomer (also referred to as a "monomer (B-2)" in the following) selected from monofunctional (meth)acrylate and a monofunctional monomer having an acidic group. Each of the monomers (A-2) and (B-2) may be used individually or in combinations of two or more.

Monomer (A-1)

Among the above monofunctional (meth)acrylates, from the viewpoint of ease of synthesis, binding properties, and ion permeability, the monofunctional (meth)acrylate of the monomer (A-1) is preferably ester (meth)acrylate, and more preferably one or a combination of two or more selected from alkyl ester (meth)acrylate having 1 to 8 carbon atoms, hydroxyalkyl (meth)acrylate, alkoxy polyalkylene glycol (meth)acrylate, and polyalkylene glycol (meth)acrylate.

When the polymer of the present disclosure contains the constitutional unit (A-1), from the viewpoint of ease of synthesis, binding properties, and ion permeability, the content of the constitutional unit (A-1) in all constitutional units of the polymer particles of the present disclosure is preferably 70% by mass or more, more preferably 75% by mass or more, even more preferably 80% by mass or more, and further preferably 85% by mass or more. From the same viewpoint, the content of the constitutional unit (A-1) is preferably 100% by mass or less, more preferably 99% by mass or less, and further preferably 97% by mass or less. If the constitutional unit (A-1) is derived from two or more types of monomers (A-1), the content of the constitutional unit (A-1) indicates the total amount of these monomers (A-1).

Monomer (B-1)

Among the above monofunctional monomers having an acidic group, from the viewpoint of ease of synthesis, binding properties, and ion permeability, the monofunctional monomer having an acidic group of the monomer (B-1) is preferably the monofunctional monomer having a carboxylic acid group. Examples of the monofunctional monomer having a carboxylic acid group include the following: (meth)acrylic acid; and unsaturated dibasic acids such as maleic acid, itaconic acid, and their salts. From the viewpoint of ease of synthesis, binding properties, and ion permeability, (meth)acrylic acid is preferred. The (meth)acrylic acid may be, e.g., one or a combination of two or more selected from acrylic acid, methacrylic acid, and their salts. From the viewpoint of ease of synthesis, binding properties, and ion permeability, the salt is preferably at least one selected from an ammonium salt, a sodium salt, a lithium salt, and a potassium salt. The salt is more preferably at least one of a lithium salt and a sodium salt. When the monomer (B-1) is a salt of (meth)acrylic acid, at least one of an acrylic acid monomer and a methacrylic acid monomer may be neutralized with an alkali (e.g., ammonia, sodium hydroxide, lithium hydroxide, or potassium hydroxide). Alternatively, at least one of an acrylate monomer and a methacrylate monomer may be neutralized after they have been polymerized to form a polymer and used as constitutional units of the polymer. From the viewpoint of controlling the polymerization reaction, the neutralization is preferably performed after the monomer is polymerized and used as a constitutional unit of the polymer.

When the polymer of the present disclosure contains the constitutional unit (B-1), from the viewpoint of ease of synthesis, binding properties, and ion permeability, the content of the constitutional unit (B-1) in all constitutional units of the polymer particles of the present disclosure is preferably 0% by mass or more, and more preferably 1% by mass or more. From the same viewpoint, the content of the constitutional unit (B-1) is preferably 10% by mass or less, more preferably 8% by mass or less, even more preferably 7% by mass or less, and further preferably 5% by mass or less. If the constitutional unit (B-1) is derived from two or more types of monomers (B-1), the content of the constitutional unit (B-1) indicates the total amount of these monomers (B-1).

When the polymer of the present disclosure contains the constitutional unit (A-1) and the constitutional unit (B-1), from the viewpoint of ease of synthesis, binding properties, and ion permeability, the mass ratio (A-1/B-1) of the constitutional unit (A-1) to the constitutional unit (B-1) in the polymer particles of the present disclosure is preferably 5 or more, more preferably 10 or more, and further preferably 15 or more. From the same view point, the mass ratio (A-1/B-1) is preferably 100 or less, more preferably 70 or less, and further preferably 50 or less.

When the polymer of the present disclosure contains the constitutional unit (A-1) and the constitutional unit (B-1), from the viewpoint of ease of synthesis, the total content of the constitutional unit (A-1) and the constitutional unit (B-1) in all constitutional units of the polymer particles of the present disclosure is preferably more than 80% by mass, more preferably 90% by mass or more, and further preferably 100% by mass.

Monomer (A-2)

The monomer (A-2) is at least one selected from monofunctional (meth)acrylate and monofunctional (meth)acrylamide. From the viewpoint of ease of synthesis, compatibility with the electrolyte solution, and the physical properties of the binder, the monomer (A-2) is preferably at least one selected from alkyl ester (meth)acrylate, ester (meth)acrylate containing a cycloalkyl group, and monofunctional (meth)acrylamide. The monomer (A-2) is more preferably a compound expressed by the following formula (I).

In the formula (I), from the viewpoint of ease of synthesis, $R^1$ represents a hydrogen atom or a methyl group. From the viewpoint of compatibility with the electrolyte solution and the physical properties of the binder, $R^2$ represents at least one selected from a linear or branched alkyl group having 1 to 6 carbon atoms and $—CH_2OR^3$. $R^2$ is more preferably a linear or branched alkyl group having 1 to 6 carbon atoms, and further preferably a linear or branched alkyl group having 1 to 4 carbon atoms. $R^3$ represents a linear or branched alkyl group having 4 to 6 carbon atoms. X represents $—O—$ or $—NH—$. In the present disclosure, $R^1$ in the formula (I), $R^1$ in the following formula (II), and $R^1$ in the following formula (III) are independent of each other.

The monomer (A-2) may be, e.g., one or a combination of two or more selected from alkyl ester (meth)acrylate, ester (meth)acrylate containing a cycloalkyl group, and monofunctional (meth)acrylamide. Examples of the alkyl ester (meth)acrylate include the following: methyl (meth)acrylate; ethyl acrylate; n-propyl (meth)acrylate; isopropyl (meth)acrylate; n-butyl (meth)acrylate; isobutyl (meth)acrylate; sec-butyl (meth)acrylate; tert-butyl (meth)acrylate; n-pentyl (meth)acrylate; and n-hexyl (meth)acrylate. Examples of the ester (meth)acrylate containing a cycloalkyl group include the following: cyclohexyl (meth)acrylate. Examples of the monofunctional (meth)acrylamide include the following: methyl (meth)acrylamide; ethyl (meth)acrylamide; n-propyl (meth)acrylamide; isopropyl (meth)acrylamide; n-butyl (meth)acrylamide; isobutyl (meth)acrylamide; sec-butyl (meth)acrylamide; tert-butyl (meth)acrylamide; n-pentyl (meth)acrylamide; n-hexyl (meth)acrylamide; and cyclohexyl (meth)acrylamide. Among them, from the viewpoint of compatibility with the electrolyte solution and the physical properties of the binder, the monomer (A-2) is preferably one or a combination of two or more selected from methyl methacrylate (MMA), ethyl methacrylate (EMA), n-butyl methacrylate (BMA), ethyl acrylate (EA), and n-butyl acrylate (BA).

When the polymer of the present disclosure contains the constitutional unit (A-2), from the viewpoint of ease of synthesis, the content of the constitutional unit (A-2) in all constitutional units of the polymer particles of the present disclosure is 50% by mass or more, preferably 60% by mass or more, more preferably 70% by mass or more, even more preferably 80% by mass or more, and further preferably 90% by mass or more. From the same viewpoint, the content of the constitutional unit (A-2) is 99.9% by mass or less, preferably 99.5% by mass or less, more preferably 99% by mass or less, even more preferably 98% by mass or less, and further preferably 97% by mass or less. The content of the constitutional unit (A-2) can be determined with a known analysis method or analyzer. If the constitutional unit (A-2) is derived from two or more types of monomers (A-2), the content of the constitutional unit (A-2) indicates the total amount of these monomers (A-2).

Monomer (B-2)

The monomer (B-2) is at least one selected from monofunctional (meth)acrylate and a monofunctional monomer having an acidic group. From the viewpoint of ease of synthesis, compatibility with the electrolyte solution, and the physical properties of the binder, the monomer (B-2) is preferably at least one selected from ester (meth)acrylate containing a hydroxyl group, ester (meth)acrylate containing a nitrogen atom, and a monofunctional monomer having a carboxylic acid group. The monomer (B-2) is more preferably at least one compound selected from a compound expressed by the following formula (II) (also referred to as a "monomer (B1)" in the following), a compound expressed by the following formula (III) (also referred to as a "monomer (B2)" in the following), and unsaturated dibasic acid (also referred to as a "monomer (B3)" in the following). The monomer (B-2) is further preferably the monomer (B1).

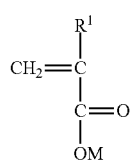

(II)

In the formula (II), from the viewpoint of ease of synthesis, $R^1$ represents a hydrogen atom or a methyl group. From the viewpoint of dispersion stability and the physical properties of the binder, M represents a hydrogen atom or a cation and is preferably a cation. From the viewpoint of dispersion stability and the physical properties of the binder, the cation is preferably at least one of an alkali metal ion and an ammonium ion. The cation is more preferably at least one selected from an ammonium ion, a lithium ion, a sodium ion, and a potassium ion. The cation is further preferably at least one of a lithium ion and a sodium ion.

When M in the formula (II) is a cation, the monomer (B1) may be obtained by neutralizing, e.g., a monomer of the formula (II) where M is a hydrogen atom with an alkali (e.g., sodium hydroxide, potassium hydroxide, lithium hydroxide, or ammonia). Alternatively, a monomer of the formula (II) where M is a hydrogen atom may be neutralized after it has been polymerized to form a polymer and used as a constitutional unit of the polymer. From the viewpoint of controlling the polymerization reaction, the neutralization is preferably performed after the monomer is polymerized and used as a constitutional unit of the polymer.

The monomer (B1) may be, e.g., one or a combination of two or more selected from acrylic acid, methacrylic acid, and their salts. The salt may be, e.g., at least one selected from an ammonium salt, a sodium salt, a lithium salt, and a potassium salt.

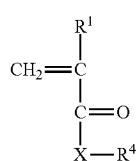

(III)

In the formula (III), $R^1$ represents a hydrogen atom or a methyl group. X represents —O— or —NH—. $R^4$ represents at least one selected from —$(CH_2)_n$OH, —$R^5SO_3M$, —$R^6N(R^7)(R^8)$, and —$R^6N^+(R^7)(R^8)(R^9) \cdot Y^-$. n represents the average number of moles added, and is 1 or more and 4 or less. $R^5$ represents a linear or branched alkylene group having 1 to 5 carbon atoms. M represents a hydrogen atom or a cation. The cation may be the same as that represented by M in the formula (II). In the present disclosure, M in the formula (II) and M in the formula (III) are independent of each other. $R^6$ represents a linear or branched alkylene group having 1 to 4 carbon atoms. $R^7$ and $R^8$ are the same or different and represent a linear or branched alkyl group having 1 to 3 carbon atoms. $R^9$ represents a linear or branched alkyl group having 1 to 3 carbon atoms. $Y^-$ represents an anion. Examples of the anion include the following: a halide ion such as a chloride ion, a bromide ion, or a fluoride ion; a sulfate ion; and a phosphate ion.

When M in the formula (III) is a cation, the monomer (B2) may be obtained by neutralizing, e.g., a monomer of the formula (III) where M is a hydrogen atom with an alkali. Alternatively, a monomer of the formula (III) where M is a hydrogen atom may be neutralized after it has been polymerized to form a polymer and used as a constitutional unit of the polymer. From the viewpoint of controlling the polymerization reaction, the neutralization is preferably performed after the monomer is polymerized and used as a constitutional unit of the polymer.

From the viewpoint of each of synthesis, the monomer (B2) may be at least one selected from ester (meth)acrylate containing a hydroxyl group and ester (meth)acrylate containing a nitrogen atom. Examples of the ester (meth)acrylate containing a hydroxyl group include the following: hydroxyethyl (meth)acrylate and hydroxypropyl (meth)acrylate. Examples of the ester (meth)acrylate containing a nitrogen atom include the following: dimethylaminoethyl (meth)acrylate; dimethylaminopropyl (meth)acrylate; and trimethylammonioethyl (meth)acrylate. The monomer (B2) is preferably at least one selected from hydroxyethyl (meth)acrylate and hydroxypropyl (meth)acrylate. The monomer (B2) is more preferably at least one of hydroxyethyl methacrylate and hydroxyethyl acrylate.

The monomer (B3) is unsaturated dibasic acid. From the viewpoint of ease of synthesis, the monomer (B3) may be, e.g., at least one selected from unsaturated dibasic acid having 4 to 12 carbon atoms and its salts. The number of carbon atoms is preferably 4 to 8, and more preferably 4 to 6.

From the viewpoint of ease of synthesis, examples of the monomer (B3) include the following: maleic acid; fumaric acid; citraconic acid; mesaconic acid; itaconic acid; 2-pentenedioic acid; 3-hexenedioic acid; and their salts. The monomer (B3) is preferably at least one selected from maleic acid, fumaric acid, itaconic acid, and their salts. The monomer (B3) is more preferably at least one of maleic acid and its salts.

When the monomer (B3) is a salt of unsaturated dibasic acid, from the viewpoint of dispersion stability and the physical properties of the binder, the salt is preferably at least one selected from an ammonium salt, a lithium salt, a sodium salt, and a potassium salt. The salt is more preferably at least one of a lithium salt and a sodium salt.

As a salt of unsaturated dibasic acid for the monomer (B3), the unsaturated dibasic acid may be neutralized with an alkali. Alternatively, the unsaturated dibasic acid may be neutralized after it has been polymerized. From the viewpoint of controlling the polymerization reaction, the neutralization is preferably performed after the monomer is polymerized and used as a constitutional unit of the polymer.

When the polymer of the present disclosure contains the constitutional unit (B-2), from the view point of dispersion stability and the physical properties of the binder, the content of the constitutional unit (B-2) in all constitutional units of the polymer particles of the present disclosure is 0.1% by mass or more, preferably 0.5% by mass or more, more preferably 1% by mass or more, even more preferably 2% by mass or more, and further preferably 3% by mass or more. From the same viewpoint, the content of the constitutional unit (B-2) is 20% by mass or less, preferably 15% by mass or less, more preferably 10% by mass or less, even more preferably 8% by mass or less, and further preferably 6% by mass or less. The content of the constitutional unit (B-2) can be determined with a known analysis method or analyzer. If the constitutional unit (B-2) is derived from two or more types of monomers (B-2), the content of the constitutional unit (B-2) indicates the total amount of these monomers (B-2).

When the polymer of the present disclosure contains the constitutional unit (A-2) and the constitutional unit (B-2), from the viewpoint of dispersion stability and the physical properties of the binder, the ratio (A-2/B-2) of the content of the constitutional unit (A-2) to the content of the constitutional unit (B-2) in the polymer particles of the present disclosure is preferably 500 or less, more preferably 100 or less, and further preferably 50 or less. From the viewpoint of dispersion stability and the physical properties of the binder, the ratio (A-2/B-2) is preferably 5 or more, more preferably 10 or more, and further preferably 20 or more.

When the polymer of the present disclosure contains the constitutional unit (A-2) and the constitutional unit (B-2), from the viewpoint of compatibility with the electrolyte solution and the physical properties of the binder, the total content of the constitutional unit (A-2) and the constitutional unit (B-2) in all constitutional units of the polymer particles of the present disclosure is preferably 80% by mass or more, more preferably 90% by mass or more, and further preferably 100% by mass.

The polymer particles of the present disclosure may contain another constitutional unit other than the constitutional units derived from the above monofunctional monomers to the extent that it does not interfere with the effects of the present disclosure. In this case, another constitutional unit may be a constitutional unit (also referred to as a "constitutional unit (C)" in the following) derived from a monomer (also referred to as a "monomer (C)" in the following) that is copolymerizable with the above monofunctional monomers. The monomer (C) may be used individually or in combinations of two or more.

The monomer (C) may be, e.g., a polyfunctional monomer. Specifically, the monomer (C) is a cross-linkable monomer having at least two vinyl groups. Examples of the cross-linkable monomer having at least two vinyl groups include polyfunctional (meth)acrylate and an aromatic divinyl compound. In the present disclosure, the polyfunctional monomer means a monomer having at least two unsaturated bonds. When the polymer particles of the present disclosure further contain the constitutional unit (C) derived from the polyfunctional monomer (C), it is possible to suppress expansion due to liquid absorption. Moreover, a battery produced by using the polymer particles that contain the constitutional unit (C) derived from the polyfunctional monomer (C) can further reduce internal resistance. Thus, the polymer particles containing the constitutional unit (C) derived from the polyfunctional monomer (C) are particularly suitable for a high capacity battery.

The polyfunctional (meth)acrylate monomer (C) may be, e.g., a compound expressed by the following formula (IV).

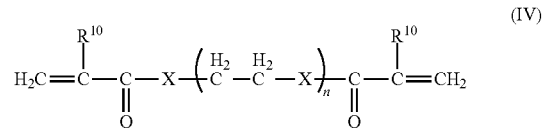

In the formula (IV), from the viewpoint of facilitating synthesis and suppressing expansion due to liquid absorption, $R^{10}$ is preferably a hydrogen atom or a methyl group. From the viewpoint of suppressing expansion due to liquid absorption, X is preferably —O— or —NH—. From the viewpoint of suppressing expansion due to liquid absorption, n is preferably an integer of 1 to 20. In the present disclosure, X in the formula (III) and X in the formula (IV) are independent of each other.

Specifically, the compound expressed by the formula (IV) may be, e.g., at least one ester di(meth)acrylate selected from the following: ethylene glycol di(meth)acrylate; diethylene glycol di(meth)acrylate; triethylene glycol di(meth)acrylate; decaethylene glycol di(meth)acrylate; and pentadecaethylene glycol di(meth)acrylate.

Other polyfunctional (meth)acrylate monomers (C) may be, e.g., at least one selected from the following: 1,3-butylene glycol di(meth)acrylate; 1,4-butanediol di(meth)acrylate; 1,6-hexanediol di(meth)acrylate; glycerol di(meth)acrylate; polyethylene glycol di(meth)acrylate; allyl (meth)acrylate; trimethylolpropane tri(meth)acrylate; pentaerythritol tetra(meth)acrylate; diethylene glycol phthalate di(meth)acrylate; caprolactone-modified dipentaerythritol hexa(meth)acrylate; caprolactone-modified hydroxypivalate ester neopentyl glycol di(meth)acrylate; polyester (meth)acrylate; and urethane (meth)acrylate.

The aromatic divinyl compound monomer (C) may be, e.g., at least one selected from divinylbenzene, divinylnaphthalene; and their derivatives.

When the polymer particles of the present disclosure contain the constitutional unit (C) derived from the polyfunctional monomer (C), from the viewpoint of suppressing expansion due to liquid absorption, the content of the constitutional unit (C) in the polymer particles of the present disclosure is preferably 0.001 mol % or more, more preferably 0.01 mol % or more, and further preferably 0.05 mol % or more with respect to the total number of moles of the constitutional units derived from the monofunctional monomers of the polymer. From the same viewpoint, the content of the constitutional unit (C) is preferably 1 mol % or less, more preferably 0.9 mol % or less, and further preferably 0.8 mol % or less. If the constitutional unit (C) is derived from two or more types of monomers (C), the content of the constitutional unit (C) indicates the total amount of these monomers (C).

Production Method of Polymer Particles

The polymer particles of the present disclosure can be produced by polymerizing, e.g., the monofunctional monomer and optionally the polyfunctional monomer. One aspect of the present disclosure relates to a method for producing polymer particles. The method includes a polymerization step of polymerizing a monomer mixture containing the monofunctional monomer and optionally the polyfunctional monomer. The polymerization method may be any known method such as an emulsion polymerization method, a solution polymerization, a suspension polymerization method, or a bulk polymerization method. From the viewpoint of ease of production of the polymer, the emulsion polymerization method is preferred.

In the present disclosure, the content of the constitutional unit (A-1) in all constitutional units of the polymer particles can be considered as a ratio of the amount of the monomer (A-1) used to the total amount of monomers used in the polymerization. The content of the constitutional unit (B-1) in all constitutional units of the polymer particles can be considered as a ratio of the amount of the monomer (B-1) used to the total amount of monomers used in the polymerization. The content ratio (A-1/B-1) of the constitutional unit (A-1) to the constitutional unit (B-1) can be considered as a ratio of the amount of the monomer (A-1) used to the amount of the monomer (B-1) used in the total amount of monomers used in the polymerization. The total content of the constitutional unit (A-1) and the constitutional unit (B-1) in all constitutional units of the polymer particles can be considered as a ratio of the total amount of the monomer (A-1) and the monomer (B-1) used to the total amount of monomers used in the polymerization. The content of the constitutional unit (A-2) in all constitutional units of the polymer particles can be considered as a ratio of the amount of the monomer (A-2) used to the total amount of monomers used in the polymerization. The content of the constitutional unit (B-2) in all constitutional units of the polymer particles can be considered as a ratio of the amount of the monomer (B-2) used to the total amount of monomers used in the polymerization. The content ratio (A-2/B-2) of the constitutional unit (A-2) to the constitutional unit (B-2) can be considered as a ratio of the amount of the monomer (A-2) used to the amount of the monomer (B-2) used in the total amount of monomers used in the polymerization. The total content of the constitutional unit (A-2) and the constitutional unit (B-2) in all constitutional units of the polymer particles can be considered as a ratio of the total amount of the monomer (A-2) and the monomer (B-2) used to the total amount of monomers used in the polymerization. The content of the constitutional unit (C) in the polymer particles can be considered as a ratio of the amount of the monomer (C) used to the total number of moles of the monofunctional monomers used in the polymerization.

The emulsion polymerization method may be either a known method that uses an emulsifier or a method that is substantially free from an emulsifier (i.e., a so-called soap-free emulsion polymerization method). From the viewpoint of battery characteristics, compatibility with the electrolyte solution, and the physical properties of the binder, the soap-free emulsion polymerization method is preferred. The polymer particles of the present disclosure may be produced by emulsion polymerization, and preferably soap-free emulsion polymerization of e.g., a monomer mixture containing the monofunctional monomer.

When an emulsifier is used in the polymerization step, from the viewpoint of ease of synthesis and polymerization stability, the emulsifier is preferably a water-soluble emulsifier. From the viewpoint of ease of synthesis and polymerization stability, the water-soluble emulsifier may be, e.g., at least one surfactant selected from an anionic surfactant, a nonionic surfactant, a cationic surfactant, an amphoteric surfactant, a high-molecular surfactant, and a reactive surfactant. From the viewpoint of binding properties and ion permeability, the reactive surfactant is preferred. The reactive surfactant is a surfactant that is incorporated into the polymer during polymerization. These surfactants may be used individually or in combinations of two or more.

Examples of the anionic surfactant include the following: sulfuric acid ester salts such as polyoxyalkylene alkyl ether sulfuric acid ester salt (e.g., polyoxyethylene lauryl ether sodium sulfate), polyoxyalkyl ether sulfuric acid ester salt, polyoxyalkylene alkylphenyl ether sulfuric acid ester salt (e.g., polyoxyethylene nonylphenyl ether sodium sulfate), polyoxyalkylene carboxylic acid ester sulfuric acid ester salt, alkyl allyl polyether sulfuric acid salt, and alkyl sulfuric acid ester salts (e.g., sodium lauryl sulfate); sulfonic acid salts such as alkyl aryl sulfonates (e.g., sodium dodecylbenzenesulfonate) and alkyl sulfonic acid ester salts (e.g., sodium lauryl sulfonate); and phosphoric acid ester salts.

Examples of the nonionic surfactant include the following: polyoxyethylene alkyl ethers such as polyoxyethylene lauryl ether; polyoxyethylene alkyl aryl ethers such as polyoxyethylene nonylphenyl ether; sorbitan fatty acid ester; polyoxyethylene sorbitan fatty acid ester; fatty acid monoglycerides such as glycerol monolaurate; a polyoxyethylene-oxypropylene copolymer; and a condensation product of ethylene oxide and aliphatic amine, amide, or acid.

Examples of the cationic surfactant include alkyl pyridinyl chloride and alkyl ammonium chloride.

Examples of the amphoteric surfactant include lauryl betaine, stearyl betaine, and lauryl dimethylamine oxide.

Examples of the high-molecular surfactant include the following: modified starch; modified cellulose; polyvinyl alcohol; sodium poly(meth)acrylate; potassium poly(meth)acrylate; ammonium poly(meth)acrylate; polyhydroxyethyl (meth)acrylate; polyhydroxypropyl (meth)acrylate; and a copolymer of two or more types of polymerizable monomers which are constitutional units of these polymers or a copolymer of the polymerizable monomers and other monomers.

The reactive surfactant may be, e.g., a reactive emulsifier that has a vinyl polymerizable double bond in molecules. Specifically, the reactive surfactant may be, e.g., polyoxyalkylene alkenyl ether.

From the viewpoint of binding properties and ion permeability, the amount of the emulsifier used in the emulsion polymerization is preferably 0.05% by mass or less, more preferably 0.02% by mass or less, even more preferably 0.01% by mass or less, and further preferably substantially 0% by mass with respect to the total amount of monomers. In the present disclosure, the amount of the emulsifier used in the emulsion polymerization can be defined as the amount of the surfactant used in the polymerization step.

In the polymerization step, a polymerization initiator may be used. From the viewpoint of polymerization stability, the polymerization initiator is preferably a water-soluble polymerization initiator. From the viewpoint of polymerization stability, examples of the water-soluble polymerization initiator include the following: persulfates such as ammonium persulfate and potassium persulfate; and peroxides such as hydrogen peroxide and t-butyl hydroperoxide. Among them, persulfates are preferred, and ammonium persulfate is more preferred.

The amount of the polymerization initiator used in the polymerization step may be appropriately determined and is preferably 0.01% by mass or more and 2% by mass or less with respect to the total amount of monomers. The amount of the polymerization initiator used in the polymerization step is preferably 0.01 mol % or more, more preferably 0.05 mol % or more, and further preferably 0.1 mol % or more with respect to the total amount of monomers. Furthermore, the amount of the polymerization initiator used in the polymerization step is preferably 5 mol % or less, more preferably 3 mol % or less, and further preferably 1 mol % or less.

In the polymerization step, water such as ion exchanged water may be used as a solvent. The amount of water used in the polymerization step may be appropriately determined and is, e.g., 40 parts by mass or more and 1500 parts by mass or less (corresponding to a polymerization solid content of 6.25 to 71.4% by mass) with respect to 100 parts by mass of the total amount of monomers.

In the polymerization step, a reducing agent that can be combined with the polymerization initiator may be used. Examples of the reducing agent include sulfite and pyrosulfite.

In the polymerization step, a chain transfer agent may be used. The chain transfer agent may be any known chain transfer agent. Examples of the chain transfer agent include mercapto compounds such as isopropyl alcohol, n-dodecyl mercaptan, octyl mercaptan, tert-butyl mercaptan, thioglycolic acid, thiomalic acid, thiosalicylic acid, and mercaptoethanol.

The polymerization conditions may be appropriately set in accordance with, e.g., the types of the polymerization initiator, monomers, and solvent that are to be used. For example, the polymerization reaction may be performed in a nitrogen atmosphere at 60 to 100° C. The polymerization time may be set to, e.g., 0.5 to 20 hours.

The arrangement of constitutional units in the polymer particles of the present disclosure can take any form such as random, block, or graft. The polymer composition analysis may be performed, e.g., with NMR spectrum, UV-vis spectrum, IR spectrum, or affinity chromatography.

The polymer particles of the present disclosure may be in the form of powder or polymer particle dispersion in which the polymer particles are dispersed in water.

From the viewpoint of battery characteristics, binding properties, ion permeability, compatibility with the electrolyte solution, and the physical properties of the binder, the average particle size of the polymer particles of the present disclosure is preferably 0.1 µm or more, and more preferably 0.2 µm or more. Furthermore, the average particle size of the polymer particles is preferably 1 µm or less, more preferably 0.9 µm or less, even more preferably 0.8 µm or less, and further preferably less than 0.7 µm.

From the viewpoint of battery characteristics, the polymer particles of the present disclosure preferably have absorption properties for the electrolyte solution. Specifically, from the viewpoint of battery characteristics, the amount of the electrolyte solution absorbed by the polymer particles of the present disclosure (also referred to as the "amount of absorption of the electrolyte solution" in the following) is preferably 130% or more, more preferably 200% or more, even more preferably 300% or more, and further preferably 500% or more. From the same viewpoint, the amount of absorption of the electrolyte solution is preferably 10000% or less, more preferably 8000% or less, and further preferably 5000% or less. In the present disclosure, the amount of absorption of the electrolyte solution may be measured with a method as described in Examples. When the amount of the electrolyte solution absorbed by the polymer particles of the present disclosure is not less than a predetermined value, alkali ions along with the electrolyte solution can pass through the resin or can be retained in the resin even in a portion of the electrode plate where the resin composition is filled and may obstruct the passage of the electrolyte solution, and thus ions on the surface of the active material may easily come in and out of the resin. Therefore, a power storage device including the electrode that is produced by using the resin composition of the present disclosure can improve the battery characteristics.

From the viewpoint of battery characteristics and blending properties with a slurry for an electrode of a power storage device, the content of the polymer particles in the resin composition of the present disclosure is preferably 20% by mass or more, more preferably 30% by mass or more, and further preferably 40% by mass or more. Furthermore, the content of the polymer particles is preferably 70% by mass or less, more preferably 65% by mass or less, and further preferably 60% by mass or less.

Aqueous Medium

The resin composition of the present disclosure may further contain an aqueous medium. The aqueous medium may be, e.g., ion exchanged water. When the resin composition of the present disclosure contains an aqueous medium, the resin composition may be in the form of, e.g., a polymer particle dispersion in which the polymer particles are dispersed in the aqueous medium. In this case, e.g., a mixed solution containing the polymer particles obtained by the above emulsion polymerization method can be directly used as a polymer particle dispersion. The content of the aqueous medium in the resin composition of the present disclosure may be the remainder after subtracting the amounts of the polymer particles and other optional components (as will be described later) from the total amount of the resin composition.

Other Optional Components

The resin composition of the present disclosure may contain optional components other than the polymer particles and the aqueous medium to the extent that they do not interfere with the effects of the present disclosure. The other optional components may be, e.g., at least one selected from a surfactant, a thickening agent, an antifoaming agent, and a neutralizing agent.

The surfactant may be any known surfactant. For example, the surfactant may be selected from the above surfactants that can be used as an emulsifier.

In the resin composition of the present disclosure, from the viewpoint of battery characteristics, the content of the surfactant is preferably 0.5% by mass or less, more preferably 0.2% by mass or less, even more preferably 0.1% by mass or less, and further preferably substantially 0% by mass with respect to the total solid content of the resin composition. Furthermore, from the viewpoint of the physical properties of the binder and an improvement in battery characteristics, the content of the surfactant is preferably 0.05% by mass or less, more preferably 0.02% by mass or less, even more preferably 0.01% by mass or less, and further preferably substantially 0% by mass with respect to the total solid content of the resin composition.

In one or more embodiments, from the viewpoint of binding properties, ion permeability, and an improvement in battery characteristics, it is preferable that the resin composition of the present disclosure contains substantially no surfactant. In the present disclosure, the content of the surfactant in the resin composition also includes the surfactant derived from the emulsifier used in the emulsion polymerization.

Production Method of Resin Composition

The resin composition of the present disclosure can be produced by blending the polymer particles and optionally the aqueous medium and other optional components with a known method. One aspect of the present disclosure relates to a method for producing a resin composition (also referred to as a "production method of the present disclosure" in the following). The production method of the present disclosure includes a blending step of blending at least the polymer particles. The blending may be performed, e.g., with a known mixing device such as a stirrer, a disperser, or a homomixer. The blending amount of each component in the blending step may be the same as the content of each component in the resin composition, as described above.

In one or more embodiments, the production method of the present disclosure may include a polymerization step of polymerizing a monomer mixture containing the monofunctional monomer and optionally the polyfunctional monomer to form polymer particles. The polymerization method and the types and amounts of components that can be used for polymerization in the polymerization step of the production method of the present disclosure may be the same as those in the polymerization step of the production method of the polymer particles, as described above.

The resin composition of the present disclosure may be used, e.g., as an electrode material for a power storage device or as a binder for an electrode of a power storage device. Moreover, the resin composition of the present disclosure may be, e.g., a binder for a positive electrode or a binder for a negative electrode and is preferably a binder for a negative electrode. Examples of the power storage device include a secondary battery and a capacitor. The resin composition of the present disclosure is preferably used, e.g., as a material of a lithium ion secondary battery.

In one or more embodiments, from the viewpoint of the physical properties of the binder and an improvement in battery characteristics, the surface tension of the resin composition of the present disclosure is preferably 55 mN/m or more, and more preferably 57 mN/m or more. Furthermore, the surface tension of the resin composition is preferably 72 mN/m or less. In one or more embodiments, when the resin composition of the present disclosure is in the form of a polymer particle dispersion, the surface tension of the polymer particle dispersion is preferably 55 mN/m or more, and more preferably 57 mN/m or more. Furthermore, the surface tension of the polymer particle dispersion is preferably 72 mN/m or less. The surface tension may be measured with a method as described in Examples.

Electrode for Power Storage Device

The resin composition of the present disclosure may be used in the production of a mixture layer of an electrode (positive electrode and/or negative electrode) for a power storage device. One aspect of the present disclosure relates to an electrode for a power storage device (also referred to as an "electrode of the present disclosure" in the following). The electrode of the present disclosure includes a current collector and a mixture layer provided on the current collector. The mixture layer includes an active material and the resin composition of the present disclosure.

The mixture layer may be obtained by preparing a slurry containing, e.g., an active material, the resin composition of the present disclosure, and a solvent, applying the slurry to a current collector, and drying the slurry to remove the solvent in the slurry. The active material may be appropriately selected in accordance with, e.g., the type of a power storage device. For example, when the electrode of the present disclosure is a negative electrode for a lithium ion secondary battery, the active material may be, e.g., a carbon material, a silicon material, a titanium material, or a tin material. When the electrode of the present disclosure is a positive electrode for a lithium ion secondary battery, the active material may be, e.g., a metal oxide, a metal phosphate, or a sulfur material. The solvent may be any solvent in which the resin composition of the present disclosure can be dissolved. Examples of the solvent include water and N-methylpyrrolidone (NMP). The current collector may be selected from conductive materials, including, e.g., metal foils such as copper foil, nickel foil, aluminum foil, and stainless foil.

Power Storage Device

One aspect of the present disclosure relates to a power storage device (referred to as a "power storage device of the present disclosure" in the following). The power storage device of the present disclosure includes the electrode of the present disclosure and an electrolyte solution.

The power storage device of the present disclosure can be produced, e.g., with a known method for producing a power storage device. The method for producing a power storage device may include the following steps: stacking two electrodes (positive electrode and negative electrode) with a separator interposed between them; winding or laminating this layered body to correspond to the shape of a battery; placing the wound or laminated body in a battery container or laminated container; putting an electrolyte solution into the container; and sealing the container.

The present disclosure further relates to one or more embodiments as follows.

<A1> A resin composition for an electrode of a power storage device, comprising:

polymer particles, wherein the polymer particles have ion permeability, and a rate of change in elasticity of the polymer particles before and after treatment with an electrolyte solution [(modulus of elasticity after treatment)/(modulus of elasticity before treatment)] is 30% or less.

<A2> The resin composition according to <A1>, wherein the polymer particles contain a constitutional unit derived from ester (meth)acrylate.

<A3> The resin composition according to <A1> or <A2>, wherein the polymer particles further contain a constitutional unit (C) derived from a polyfunctional monomer (C).

<A4> The resin composition according to any one of <A1> to <A3>, wherein the polymer particles contain a constitutional unit (A-2) derived from a compound expressed by the following formula (I) and a constitutional unit (B-2) derived from at least one compound selected from a compound expressed by the following formula (II), a compound expressed by the following formula (III), and unsaturated dibasic acid, a content of the constitutional unit (A-2) in all constitutional units of the polymer particles is 50% by mass or more and 99.9% by mass or less, a content of the constitutional unit (B-2) in all constitutional units of the polymer particles is 0.1% by mass or more and 20% by mass or less, and a surface tension of the resin composition is 55 mN/m or more,

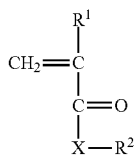

[in the formula (I), $R^1$ represents a hydrogen atom or a methyl group; $R^2$ represents at least one selected from a linear or branched alkyl group having 1 to 6 carbon atoms and —$CH_2OR^3$; $R^3$ represents a linear or branched alkyl group having 4 to 6 carbon atoms; and X represents —O— or —NH—,]

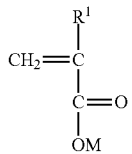

[in the formula (II), $R^1$ represents a hydrogen atom or a methyl group; and M represents a hydrogen atom or a cation,]

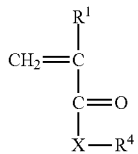

[in the formula (III), $R^1$ represents a hydrogen atom or a methyl group; X represents —O— or —NH—; $R^4$ represents at least one selected from —$(CH_2)_n$OH, —$R^5SO_3M$, —$R^6N(R^7)(R^8)$, and —$R^6N^+(R^7)(R^8)(R^9).Y^-$; n represents 1 or more and 4 or less; $R^5$ represents a linear or branched alkylene group having 1 to 5 carbon atoms; M represents a hydrogen atom or a cation; $R^6$ represents a linear or branched alkylene group having 1 to 4 carbon atoms; $R^7$ and $R^8$ are the same or different and represent a linear or branched alkyl group having 1 to 3 carbon atoms; $R^9$ represents a linear or branched alkyl group having 1 to 3 carbon atoms; and $Y^-$ represents an anion.]

<A5> The resin composition according to <A4>, wherein a total content of the constitutional unit (A-2) and the constitutional unit (B-2) in all constitutional units of the polymer particles is 80% by mass or more.

<A6> The resin composition according to <A4> or <A5>, wherein in the formula (I), $R^1$ represents a hydrogen atom, $R^2$ represents a linear or branched alkyl group having 1 to 6 carbon atoms, and X represents —O—, and wherein the constitutional unit (B-2) is derived from the compound expressed by the formula (II), and in the formula (II), $R^1$ represents a hydrogen atom or a methyl group and M represents a hydrogen atom or a cation.

<A7> The resin composition according to any one of <A4> to <A6>, wherein the polymer particles contain a constitutional unit (C) derived from a polyfunctional monomer (C), and a content of the constitutional unit (C) in the polymer particles is 0.001 mol % or more and 1 mol % or less with respect to a total number of moles of the constitutional unit (A-2) and the constitutional unit (B-2).

<A8> The resin composition according to any one of <A4> to <A7>, wherein the polymer particles are obtained by emulsion polymerization of a monomer mixture containing a compound expressed by the formula (I), at least one compound selected from a compound expressed by the formula (II), a compound expressed by the formula (III), and unsaturated dibasic acid, and selectively a polyfunctional monomer (C).

<A9> The resin composition according to <A8>, wherein the emulsion polymerization is soap-free emulsion polymerization.

<A10> The resin composition according to any one of <A1> to <A9>, wherein an average particle size of the polymer particles is 0.1 μm or more and less than 0.7 μm.

<A11> The resin composition according to any one of <A1> to <A10>, further comprising an aqueous medium, wherein the resin composition is in the form of a polymer particle dispersion in which the polymer particles are dispersed in the aqueous medium.

<A12> The resin composition according to any one of <A1> to <A11>, serving as a binder for a positive electrode or a negative electrode.

<A15> An electrode for a power storage device, comprising:

a current collector; and a mixture layer provided on the current collector, wherein the mixture layer includes an active material and the resin composition according to any one of <A1> to <A12>.

The present disclosure further relates to one or more embodiments as follows.

<B1> A resin composition for an electrode of a power storage device, comprising:

polymer particles containing a constitutional unit (A-2) derived from a compound expressed by the following formula (I) and a constitutional unit (B-2) derived from at least one compound selected from a compound expressed by the following formula (II), a compound expressed by the following formula (III), and unsaturated dibasic acid, wherein a content of the constitutional unit (A-2) in all constitutional units of the polymer particles is 50% by mass or more and 99.9% by mass or less, a content of the constitutional unit (B-2) in all constitutional units of the polymer particles is 0.1% by mass or more and 20% by mass or less, and a surface tension of the resin composition is 55 mN/m or more,

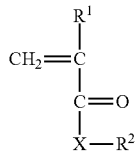

[in the formula (I), $R^1$ represents a hydrogen atom or a methyl group; $R^2$ represents at least one selected from a linear or branched alkyl group having 1 to 6 carbon atoms and —CH$_2$OR$^3$; R$^3$ represents a linear or branched alkyl group having 4 to 6 carbon atoms; and X represents —O— or —NH—,]

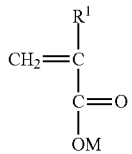

(II)

[in the formula (II), R$^1$ represents a hydrogen atom or a methyl group; and M represents a hydrogen atom or a cation,]

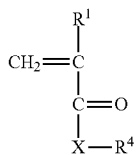

(III)

[in the formula (III), R$^1$ represents a hydrogen atom or a methyl group; X represents —O— or —NH—; R$^4$ represents at least one selected from —(CH$_2$)$_n$OH, —R$^5$SO$_3$M, —R$^6$N(R$^7$)(R$^8$), and —R$^6$N$^+$(R$^7$)(R$^8$)(R$^9$).Y$^-$; n represents 1 or more and 4 or less; R$^5$ represents a linear or branched alkylene group having 1 to 5 carbon atoms; M represents a hydrogen atom or a cation; R$^6$ represents a linear or branched alkylene group having 1 to 4 carbon atoms; R$^7$ and R$^8$ are the same or different and represent a linear or branched alkyl group having 1 to 3 carbon atoms; R$^9$ represents a linear or branched alkyl group having 1 to 3 carbon atoms; and Y$^-$ represents an anion.]

<B2> The resin composition according to <B1>, wherein the content of the constitutional unit (A-2) in all constitutional units of the polymer particles is preferably 60% by mass or more, more preferably 70% by mass or more, even more preferably 80% by mass or more, and further preferably 90% by mass or more.

<B3> The resin composition according to <B1> or <B2>, wherein the content of the constitutional unit (A-2) in all constitutional units of the polymer particles is preferably 99.5% by mass or less, more preferably 99% by mass or less, even more preferably 98% by mass or less, and further preferably 97% by mass or less.

<B4> The resin composition according to any one of <B1> to <B3>, wherein the content of the constitutional unit (B-2) in all constitutional units of the polymer particles is preferably 0.5% by mass or more, more preferably 1% by mass or more, even more preferably 2% by mass or more, and further preferably 3% by mass or more.

<B5> The resin composition according to any one of <B1> to <B4>, wherein the content of the constitutional unit (B-2) in all constitutional units of the polymer particles is preferably 15% by mass or less, more preferably 10% by mass or less, even more preferably 8% by mass or less, and further preferably 6% by mass or less.

<B6> The resin composition according to any one of <B1> to <B5>, wherein a ratio (A-2/B-2) of the content of the constitutional unit (A-2) to the content of the constitutional unit (B-2) in the polymer particles is preferably 500 or less, more preferably 100 or less, and further preferably 50 or less.

<B7> The resin composition according to any one of <B1> to <B6>, wherein the ratio (A-2/B-2) of the content of the constitutional unit (A) to the content of the constitutional unit (B-2) in the polymer particles is preferably 5 or more, more preferably 10 or more, and further preferably 20 or more.

<B8> The resin composition according to any one of <B1> to <B7>, wherein a total content of the constitutional unit (A-2) and the constitutional unit (B-2) in all constitutional units of the polymer particles is preferably 80% by mass or more, more preferably 90% by mass or more, and further preferably 100% by mass.

<B9> The resin composition according to any one of <B1> to <B8>, wherein in the formula (I), R$^1$ represents a hydrogen atom, R$^2$ represents a linear or branched alkyl group having 1 to 6 carbon atoms, and X represents —O—, and wherein the constitutional unit (B-2) is derived from the compound expressed by the formula (II), and in the formula (II), R$^1$ represents a hydrogen atom or a methyl group and M represents a hydrogen atom or a cation.

<B10> The resin composition according to any one of <B1> to <B9>, wherein the polymer particles further contain a constitutional unit (C) derived from a polyfunctional monomer, and a content of the constitutional unit (C) in the polymer particles is 0.001 mol % or more and 1 mol % or less with respect to a total number of moles of the constitutional unit (A-2) and the constitutional unit (B-2).

<B11> The resin composition according to <B10>, wherein the content of the constitutional unit (C) in the polymer particles is preferably 0.001 mol % or more, more preferably 0.01 mol % or more, and further preferably 0.05 mol % or more with respect to the total number of moles of the constitutional unit (A-2) and the constitutional unit (B-2).

<B12> The resin composition according to <B10> or <B11>, wherein the content of the constitutional unit (C) in the polymer particles is preferably 1 mol % or less, more preferably 0.9 mol % or less, and further preferably 0.8 mol % or less with respect to the total number of moles of the constitutional unit (A-2) and the constitutional unit (B-2).

<B13> The resin composition according to any one of <B10> to <B12>, wherein the polyfunctional monomer is a compound expressed by the following formula (IV),

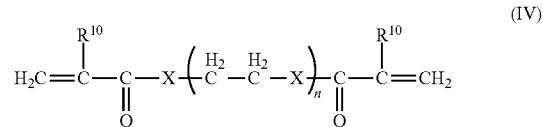

(IV)

[in the formula (IV), R$^{10}$ represents a hydrogen atom or a methyl group; X represents —O— or —NH—; and n represents an integer of 1 to 20.]

<B14> The resin composition according to any one of <B1> to <B9>, wherein the polymer particles are obtained by emulsion polymerization of a monomer mixture containing a compound expressed by the formula (I), at least one compound selected from a compound expressed by the formula (II), a compound expressed by the formula (III), and unsaturated dibasic acid, and selectively a polyfunctional monomer.

<B15> The resin composition according to <B14>, wherein an amount of an emulsifier used in the emulsion polymerization is preferably 0.05% by mass or less, more preferably 0.02% by mass or less, even more preferably 0.01% by mass or less, and further preferably substantially 0% by mass with respect to a total amount of monomers.

<B16> The resin composition according to <B14> or <B15>, wherein the emulsion polymerization is soap-free emulsion polymerization.

<B17> The resin composition according to any one of <B1> to <B16>, wherein an average particle size of the polymer particles is 0.1 μm or more and less than 0.7 μm.

<B18> The resin composition according to any one of <B1> to <B17>, wherein the average particle size of the polymer particles is preferably 0.1 μm or more, and more preferably more than 0.3 μm.

<B19> The resin composition according to any one of <B1> to <B18>, wherein the average particle size of the polymer particles is preferably 1 μm or less, more preferably 0.9 μm or less, even more preferably 0.8 fm or less, and further preferably less than 0.7 μm.

<B20> The resin composition according to any one of <B1> to <B19>, wherein a content of the polymer particles in the resin composition is preferably 20% by mass or more, more preferably 30% by mass or more, and further preferably 40% by mass or more.

<B21> The resin composition according to any one of <B1> to <B20>, wherein the content of the polymer particles in the resin composition is preferably 70% by mass or less, more preferably 65% by mass or less, and further preferably 60% by mass or less.

<B22> The resin composition according to any one of <B1> to <B21>, wherein a content of a surfactant is preferably 0.05% by mass or less, more preferably 0.02% by mass or less, even more preferably 0.01% by mass or less, and further preferably substantially 0% by mass with respect to a total solid content of the resin composition.

<B23> The resin composition according to any one of <B1> to <B22>, further comprising an aqueous medium, wherein the resin composition is in the form of a polymer particle dispersion in which the polymer particles are dispersed in the aqueous medium.

<B24> The resin composition according to any one of <B1> to <B23>, wherein the surface tension of the resin composition is preferably 57 mN/m or more.

<B25> The resin composition according to any one of <B1> to <B24>, wherein the surface tension of the resin composition is preferably 72 mN/m or less.

<B26> A method for producing a resin composition for an electrode of a power storage device, the resin composition comprising polymer particles,
the method comprising:
a polymerization step of polymerizing a monomer mixture containing a monomer (A-2) and a monomer (B-2) to form polymer particles,
wherein the monomer (A-2) is a compound expressed by the following formula (I),
the monomer (B-2) is at least one compound selected from a compound expressed by the following formula (II), a compound expressed by the following formula (III), and unsaturated dibasic acid,
an amount of the monomer (A-2) used in the polymerization step is 50% by mass or more and 99.9% by mass or less with respect to a total amount of monomers,
an amount of the monomer (B-2) used in the polymerization step is 0.1% by mass or more and 20% by mass or less with respect to the total amount of monomers, and
an amount of a surfactant used in the polymerization step is 0.05% by mass or less with respect to the total amount of monomers,

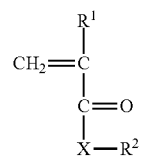
(I)

[in the formula (I), $R^1$ represents a hydrogen atom or a methyl group; $R^2$ represents at least one selected from a linear or branched alkyl group having 1 to 6 carbon atoms and —$CH_2OR^3$; $R^3$ represents a linear or branched alkyl group having 4 to 6 carbon atoms; and X represents —O— or —NH—,]

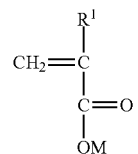
(II)

[in the formula (II), $R^1$ represents a hydrogen atom or a methyl group; and M represents a hydrogen atom or a cation,]

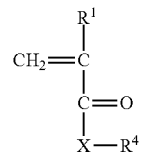
(III)

[in the formula (III), $R^1$ represents a hydrogen atom or a methyl group; X represents —O— or —NH—; $R^4$ represents at least one selected from —$(CH_2)_nOH$, —$R^5SO_3M$, —$R^6N(R^7)(R^8)$, and —$R^6N^+(R^7)(R^8)(R^9).Y^-$; n represents 1 or more and 4 or less; $R^5$ represents a linear or branched alkylene group having 1 to 5 carbon atoms; M represents a hydrogen atom or a cation; $R^6$ represents a linear or branched alkylene group having 1 to 4 carbon atoms; $R^7$ and $R^8$ are the same or different and represent a linear or branched alkyl group having 1 to 3 carbon atoms; $R^9$ represents a linear or branched alkyl group having 1 to 3 carbon atoms; and $Y^-$ represents an anion.]

<B27> The method according to <B26>, wherein the amount of the monomer (A-2) used in the polymerization step is preferably 60% by mass or more, more preferably 70% by mass or more, even more preferably 80% by mass or more, and further preferably 90% by mass or more with respect to the total amount of monomers used in the polymerization.

<B28> The method according to <B26> or <B27>, wherein the amount of the monomer (A-2) used in the polymerization step is preferably 99.5% by mass or less, more preferably 99% by mass or less, even more preferably 98% by mass or less, and further preferably 97% by mass or less with respect to the total amount of monomers used in the polymerization.

<B29> The method according to any one of <B26> to <B28>, wherein the amount of the monomer (B-2) used in the polymerization step is preferably 0.5% by mass or more, more preferably 1% by mass or more, even more preferably 2% by mass or more, and further preferably 3% by mass or more with respect to the total amount of monomers used in the polymerization.

<B30> The method according to any one of <B26> to <B29>, wherein the amount of the monomer (B-2) used in the polymerization step is preferably 15% by mass or less, more preferably 10% by mass or less, even more preferably 8% by mass or less, and further preferably 6% by mass or less with respect to the total amount of monomers used in the polymerization.

<B31> The method according to any one of <B26> to <B30>, wherein a ratio (A-2/B-2) of the amount of the monomer (A-2) used to the amount of the monomer (B-2) used in the polymerization step is preferably 500 or less, more preferably 100 or less, and further preferably 50 or less.

<B32> The method according to any one of <B26> to <B31>, wherein the ratio (A-2/B-2) of the amount of the monomer (A-2) used to the amount of the monomer (B-2) used in the polymerization step is preferably 5 or more, more preferably 10 or more, and further preferably 20 or more.

<B33> The resin composition according to any one of <B26> to <B32>, wherein a total amount of the monomer (A-2) and the monomer (B-2) used in the polymerization step is preferably 80% by mass or more, more preferably 90% by mass or more, and further preferably 100% by mass with respect to the total amount of monomers used in the polymerization.

<B34> The method according to any one of <B26> to <B33>, wherein an amount of a polymerization initiator used in the polymerization step is preferably 0.01 mol % or more, more preferably 0.05 mol % or more, and further preferably 0.1 mol % or more with respect to the total amount of monomers used in the polymerization.

<B35> The method according to any one of <B26> to <B34>, wherein the amount of the polymerization initiator used in the polymerization step is preferably 5 mol % or less, more preferably 3 mol % or less, and further preferably 1 mol % or less with respect to the total amount of monomers used in the polymerization.

<B36> The method according to any one of <B26> to <B35>, wherein the amount of the surfactant used in the polymerization step is preferably 0.05% by mass or less, more preferably 0.02% by mass or less, even more preferably 0.01% by mass or less, and further preferably substantially 0% by mass with respect to the total amount of monomers used in the polymerization.

<B37> The method according to any one of <B26> to <B36>, wherein the monomer mixture further contains a polyfunctional monomer (C), and an amount of the polyfunctional monomer (C) used in the polymerization step is 0.001 mol % or more and 1 mol % or less with respect to a total number of moles of the monomer (A-2) and the monomer (B-1) that are used in the polymerization.

<B38> An electrode for a power storage device, comprising:
a current collector; and
a mixture layer provided on the current collector,
wherein the mixture layer includes an active material and the resin composition according to any one of <B1> to <B25>.

<B39> A power storage device comprising:
the electrode according to <B38>; and
an electrolyte solution.

EXAMPLES

Hereinafter, the present disclosure will be described by way of examples, but the present disclosure is not limited to the following examples.

1. Preparation of Polymer Particle Dispersion
(Examples 1 to 4 and Comparative Example 1)

The following materials were used to prepare polymer particle dispersions of Examples 1 to 4 and Comparative Example 1, as shown in Table 1. The abbreviations for the materials used in Table 1 and the following examples are as follows.

Monomer (A-1)

MMA: methyl methacrylate (manufactured by Wako Pure Chemical Industries, Ltd.)
EA: ethyl acrylate (manufactured by Wako Pure Chemical Industries, Ltd.)
BA: butyl acrylate (manufactured by Wako Pure Chemical Industries, Ltd.)
2-EHA: 2-ethylhexyl acrylate Monomer (B-1)

AA: acrylic acid (manufactured by Wako Pure Chemical Industries, Ltd.)

Monomer (C)

EGDMA: ethylene glycol dimethacrylate (manufactured by Wako Pure Chemical Industries, Ltd.)

Polymerization Initiator

APS: ammonium persulfate
KPS: potassium persulfate

Neutralization Salt

Na: sodium
Li: lithium
$NH_4$: ammonium

Emulsifier sodium dodecylbenzenesulfonate

Polymer Particle Dispersion of Example 1

In a 1 L four-necked separable glass flask were placed 194 g of EA as a monomer (A-1), 6 g of AA as a monomer (B-1), 0.20 g of EGDMA [0.1 mol % with respect to the total number of moles of the monomer (A-1) and the monomer (B-1)] as a monomer (C), and 340 of ion exchanged water. This solution was stirred for a predetermined time (0.5 hours) in a nitrogen atmosphere. Then, the temperature of the reaction solution in the flask was increased to about 70°

C. Subsequently, a polymerization initiator solution, in which 1 g of APS was dissolved in 10 g of ion exchanged water, was added to the flask, and the reaction solution in the flask was held at about 70 to 75° C. for 6 hours. Thus, the reaction solution was polymerized and aged, resulting in a polymer particle dispersion. Thereafter, the polymer particle dispersion in the flask was cooled to room temperature and neutralized with 29.14 g of 1N LiOH aqueous solution. Then, aggregates were removed by using a 200 mesh filter cloth. The polymer particle dispersion was condensed to a concentration of about 30 to 35% by mass, so that a polymer particle dispersion of Example 1 was prepared. Table 1 shows the amounts and types of components used in the preparation of the polymer particle dispersion of Example 1.

Polymer Particle Dispersion of Example 2

A polymer particle dispersion of Example 2 was prepared in the same manner as Example 1 except that the amount of the monomer (C) was changed to 1.0 g [0.5 mol % with respect to the total number of moles of the monomer (A-1) and the monomer (B-1)]. Table 1 shows the amounts and types of components used in the preparation of the polymer particle dispersion of Example 2.

Polymer Particle Dispersion of Example 3

A polymer particle dispersion of Example 3 was prepared in the same manner as Example 1 except that the monomer (C) was not used. Table 1 shows the amounts and types of components used in the preparation of the polymer particle dispersion of Example 3.

Polymer Particle Dispersion of Example 4

A polymer particle dispersion of Example 4 was prepared in the same manner as Example 1 except that the type and amount of the monomer (A-1) was changed to 60 g of MMA and 120 g of BA, the type and amount of the monomer (B-1) was changed to 20 g of AA, and the monomer (C) was not used. Table 1 shows the amounts and types of components used in the preparation of the polymer particle dispersion of Example 4.

Polymer Particle Dispersion of Comparative Example 1

In a 1 L four-necked separable glass flask were placed 69 g of 2-EHA as a monomer (A-1), 3.75 g of AA as a monomer (B-1), 2.25 g of EGDMA [2.66 mol % with respect to the total number of moles of the monomer (A-1) and the monomer (B-1)] as a monomer (C), 183 g of ion exchanged water, and 1.5 g of emulsifier (sodium dodecylbenzenesulfonate). This solution was stirred for a predetermined time (0.5 hours) in a nitrogen atmosphere. Then, the temperature of the reaction solution in the flask was increased to about 70° C. Subsequently, a polymerization initiator solution, in which 0.23 g of KPS was dissolved in 10 g of ion exchanged water, was added to the flask, and the reaction solution in the flask was held at about 60 to 65° C. for 6 hours. Thus, the reaction solution was polymerized and aged, resulting in a polymer particle dispersion. Thereafter, the polymer particle dispersion in the flask was cooled to room temperature and adjusted to a pH of 6 with 10% ammonia water. Then, aggregates were removed by using a 200 mesh filter cloth. The polymer particle dispersion was condensed to a concentration of about 30 to 35% by mass, so that a polymer particle dispersion of Comparative Example 1 was prepared. Table 1 shows the amounts and types of components used in the preparation of the polymer particle dispersion of Comparative Example 1.

2. Physical Properties of Polymer Particles (Examples 1 to 4 and Comparative Example 1)

The modulus of elasticity, the rate of change in elasticity, the solubility, the glass transition temperature, the average particle size, and the amount of liquid absorption of the polymer particles in each of Examples 1 to 4 and Comparative Example 1 were determined in the following manner. Table 2 shows the results. Moreover, Table 2 shows the sp of the polymer particles and the Δsp between the polymer particles and EC/DEC (volume ratio 1/1) in each of Examples 1 to 4 and Comparative Example 1.

Modulus of Elasticity and Rate of Change in Elasticity

The polymer particle dispersion was dried on a flat plate to form a film-like polymer (referred to as a "polymer particle film" in the following). Then, 1 g of polymer particle film was immersed in 100 g of electrolyte solution and allowed to stand at room temperature (25° C.) for 72 hours. The electrolyte solution was an EC/DEC mixed solvent (volume ratio 1/1). After the immersion, the polymer particle film was taken out, and excess electrolyte solution was wiped off. Subsequently, the polymer particle film was cut to 1 cm square. Using a rheometer ("MCR 302" manufactured by Anton Paar), the polymer particle film was measured under the following conditions: the measurement temperature was 25° C.; the jig was PP08; the normal force was 1 N; the frequency was 2 Hz; and the strain was 0.01 to 1000%. The rate of change in elasticity was calculated by using a storage elastic modulus at an angular velocity of 0.01 (1/s). The polymer particle film before the immersion in the electrolyte solution was measured under the same conditions.

Rate of change in elasticity (%)=storage elastic modulus of film after immersion/storage elastic modulus of film before immersion×100

Solubility

The solubility was calculated by using the existing measurement table that is specific to each substance. When the polymer particle dispersion was a mixture, the solubility was divided proportionally to the mixing ratio. The electrolyte solution was an EC/DEC mixed solvent (volume ratio 1/1) or an EC/DEC mixed solvent (volume ratio 3/7).

Glass Transition Temperature (Tg)

The glass transition temperature Tg was calculated from the following formula (I) based on Tgn of the homopolymers of each of the monomers constituting the polymer in accordance with the Fox equation [T. G. Fox, Bull. Am. Physics. Soc., Vol. 1, No. 3, p. 123 (1956)].

$$1/Tg=\Sigma(Wn/Tgn) \qquad (I)$$

where Tgn represents Tg that is expressed as the absolute temperature of the homopolymer of each monomer component, and Wn represents the mass fraction of each monomer component.

Average Particle Size of Polymer Particles

The average particle size of the polymer particles was measured with a laser beam diffraction particle size analyzer ("LA-920" manufactured by HORIBA Ltd.) at room temperature. In this case, the polymer particle dispersion was diluted with a dispersion medium (water) until the light intensity was within a predetermined range of the analyzer.

Amount of Liquid Absorption 1 g of polymer particle film obtained by drying the polymer particle dispersion was immersed in 300 g of electrolyte solution and allowed to stand at room temperature (25° C.) for 72 hours. Then, the precipitate was filtered off with a membrane filter, and the weight of the precipitate was measured. The amount of liquid absorption was calculated from the following formula. The electrolyte solution was an EC/DEC mixed solvent (volume ratio 1/1).

Amount of liquid absorption (%)=[weight (g) of precipitate absorbing electrolyte solution−weight (g) of polymer before immersion]/weight (g) of polymer before immersion×100

3. Evaluation of Ion Permeability

[Evaluation with inductively coupled plasma mass spectrometry (ICP-MS)]

First, an EC/DEC mixed solvent I (volume ratio 1/1) containing no lithium (Li) salt and a lithium-containing solvent II (1 mol/L LiClO$_4$) in which lithium perchlorate was dissolved in an EC/DEC mixed solvent (volume ratio 1/1) were prepared. Next, the polymer particle dispersion was poured into a Teflon-coated tray in an amount such that the thickness of the polymer particle dispersion would be 0.7 mm after drying. The polymer particle dispersion was dried at 105° C. for 24 hours, so that a polymer film (thickness: 0.7 mm) was produced. Then, the polymer film was shaken for 8 hours with one side in contact with the EC/DEC mixed solvent I and the other side in contact with the lithium-containing solvent II. Subsequently, the presence or absence of Li in the EC/DEC mixed solvent I was confirmed with inductively coupled plasma mass spectrometry (ICP-MS). Table 2 shows the results. In Table 2, "A" represents the detection of Li, which indicates that the polymer film had ion permeability, and "B" represents the non-detection of Li, which indicates that the polymer film did not have ion permeability.

Evaluation with Alternating-Current Impedance Method

Production of Measuring Electrode

First, 94.8 parts by weight of graphite ("SMG" manufactured by Hitachi Chemical Company, Ltd.) as a negative electrode active material, 1.7 parts by mass of acetylene black ("HS-100" manufactured by Denka Company Limited) as a conductive assistant, 1.5 parts by mass of sodium carboxymethyl cellulose (manufactured by Wako Pure Chemical Industries, Ltd.) as a thickening agent, 2 pars by mass of binder, and 122 parts by mass of water were mixed to prepare a slurry. Then, the slurry was applied to a copper foil with a thickness of 20 μm, dried, and pressed, thereby forming a negative electrode active material layer with a thickness of 27 μm. Subsequently, the negative electrode active material layer was punched to a size with a diameter of 18 mm and used as a measuring electrode.

Assembly of Measuring Cell

Using a three-electrode cell ("TSB-1" manufactured by TOYO Corporation), the measuring electrode was set to a working electrode and metallic Li was set to a reference electrode and to an auxiliary electrode. Then, as a non-aqueous electrolyte solution, a 1M LiPF$_6$ solution [solvent: EC/EMC mixed solvent (volume ratio 3/7), manufactured by KISHIDA CHEMICAL Co., Ltd.] was injected into the cell, and thus a measuring cell was provided.

Measurement of Alternating-Current Impedance

Using a potentio-galvanostat ("SI 1287" manufactured by Solartron Metrology), the reference electrode was charged with a constant current (0.45 mA) until the voltage reached 0.1 V at a temperature of 25° C. After the cell was cooled to −10° C., the alternating-current impedance (at 10 mV and a frequency of 0.05 Hz to 100 KHz) was measured with an impedance gain analyzer (FRA) ("1260A" manufactured by Solartron Metrology). A resistance value was calculated from the arc width in the resulting Cole-Cole plot. Table 2 shows the measurement results. The smaller the resistance value, the better the ion permeability.

TABLE 1

| | Monomer composition of polymer | | | | | | | | |
|---|---|---|---|---|---|---|---|---|---|
| | Monomer (A-1) | | | | Monomer (B-1) | | Monomer (C) EGDMA mol % (with respect to | Polymerization initiator mass % (with respect to | Emulsifier mass % (with respect to | |
| | MMA mass % | EA mass % | BA mass % | 2-EHA mass % | AA mass % | Mass ratio (A-1)/(B-1) | monomer (A-1) + (B-1)) | monomer) | monomer) | Neutralization salt |
| EX. 1 | — | 97 | — | — | 3 | 32.3 | 0.1 | 0.5 | 0 | Li |
| EX. 2 | — | 97 | — | — | 3 | 32.3 | 0.5 | 0.5 | 0 | Li |
| EX. 3 | — | 97 | — | — | 3 | 32.3 | — | 0.5 | 0 | Li |
| Ex. 4 | 30 | — | 60 | — | 10 | 9 | — | 0.5 | 0 | Li |
| Comp. Ex. 1 | — | — | — | 92 | 5 | 18.4 | 2.66 | 0.3 | 2.0 | NH$_4$ |

TABLE 2

| | Modulus of elasticity | | Rate of change in elasticity % | Solubility in electrolyte solution | | Solubility parameter sp $(cal/cm^3)^{1/2}$ | $\Delta sp$ EC/DEC = 1/1 $(cal/cm^3)^{1/2}$ |
|---|---|---|---|---|---|---|---|
| | Before immersion % | After immersion % | | EC/DEC = 1/1 mass % | EC/DEC = 3/7 mass % | | |
| Ex. 1 | $4.63 \times 10^5$ | $8.64 \times 10^2$ | 0.19 | <1 | <1 | 10.33 | 0.21 |
| Ex. 2 | $4.50 \times 10^5$ | $8.16 \times 10^2$ | 0.18 | <1 | <1 | 10.34 | 0.22 |
| EX. 3 | $3.97 \times 10^5$ | $6.04 \times 10^2$ | 0.15 | <1 | <1 | 10.33 | 0.21 |
| Ex. 4 | $4.58 \times 10^5$ | $4.26 \times 10^5$ | 9.30 | <1 | <1 | 10.31 | 0.19 |
| Comp. Ex. 1 | $3.14 \times 10^5$ | $1.35 \times 10^5$ | 43.00 | <1 | <1 | 9.77 | 0.35 |

| | Tg °C. | Particle size μm | Absorption of electrolyte solution EC/DEC = 1/1 % | Ion permeability | |
|---|---|---|---|---|---|
| | | | | ICP-MS Ion detection | AC impedance −10° C. resistance Ω |
| Ex. 1 | −17.5 | 0.27 | 1720 | A | 259 |
| Ex. 2 | −17.5 | 0.30 | 1720 | A | 260 |
| EX. 3 | −17.5 | 0.38 | 3860 | A | 250 |
| Ex. 4 | −9.7 | 0.38 | 130 | A | 483 |
| Comp. Ex. 1 | −38.1 | 0.09 | 50 | unknown | 567 |

As shown in Table 2, the rate of change in elasticity of the polymer particles was significantly reduced in Examples 1 to 4, compared to Comparative Example 1. In Comparative Example 1, although the modulus of elasticity before immersion in the electrolyte solution was close to the values of Examples 1 to 4, the modulus of elasticity after immersion remained high.

4. Production and Evaluation of Electrode (Examples 5 to 6)

Production of Negative Electrode

In Examples 5 to 6, negative electrode pastes with the compositions shown in Table 3 were prepared and used to produce negative electrodes in the following manner, respectively. The materials of the negative electrode pastes were as follows.

Resin Composition: Polymer Particle Dispersions of Examples 1, 2 and Comparative Example 1

Negative electrode active material: graphite ("AF-C" manufactured by Showa Denko KK.)
Negative electrode conductive material: carbon fiber ("VGCF—H" manufactured by Showa Denko KK.)
Negative electrode thickening agent: sodium carboxymethyl cellulose (CMC) ("#2200" manufactured by Daicel Corporation)

First, 288 g of negative electrode active material, 3 g of negative electrode conductive material, and 3 g of negative electrode thickening agent were mixed. Then, distilled water was gradually added to the mixture in an amount necessary to give a final solid content concentration of 50 to 55% by mass, and this mixture was kneaded with a disperser. Subsequently, 6 g of resin composition as a polymer solid content was added to the kneaded mixture, which was further kneaded with a disperser. Next, deaeration was performed with a stirring deaerator ("THINKY MIXER" manufactured by THINKY CORPORATION), and coarse particles were removed by using a 150 mesh filter cloth. Thus, a negative electrode paste was prepared in each of Examples 5 to 6. The solid content concentration (% by mass) of the negative electrode paste means the total amount (% by mass) of solid contents of the materials, including the negative electrode active material, the negative electrode conductive material, the negative electrode thickening agent, and the resin composition, contained in the negative electrode paste. The solid content concentration of the negative electrode paste and the resin composition was calculated by measuring a reduction in weight after the negative electrode paste was dried at 105° C. for 24 hours. The viscosity of the negative electrode paste was measured with a B-type viscometer (temperature: 25° C., rotational speed: 6 rpm, rotor No. 3).

Next, each of the negative electrode pastes of Examples 5 to 6 was applied to a copper foil (current collector) with a bar coater, and the thickness was adjusted so that the coating would be 80 g/m² after drying. Then, the coating was dried at 80° C. for 5 minutes with a forced-air drier, and further dried at 150° C. for 10 minutes. Subsequently, the coating was roll-pressed into a negative electrode mixture layer with an electrode density of 1.3 to 1.4 g/cm³, which was allowed to stand at least overnight in a drying room. Thus, a negative electrode including the negative electrode mixture layer was produced.

Evaluation of Binding Properties of Negative Electrode

The negative electrode thus obtained was punched to a size of 45 mm×45 mm, and then valley folded to form a triangle with the corners aligned together. At this time, the negative electrode was creased well by running a finger along the fold. Next, the negative electrode was unfolded and opened again to confirm whether the coating (negative electrode mixture layer) peeled off. If there was no peeling, the negative electrode was evaluated as "A". If there was peeling, the negative electrode was evaluated as "B". Table 3 shows the results.

TABLE 3

| | Resin composition (polymer particle dispersion) | | Active material | Conductive material | Thickening agent | Solid content concentration | Viscosity | Binding property |
|---|---|---|---|---|---|---|---|---|
| | Type | mass % | mass % | mass % | mass % | mass % | mPa · s | property |
| Ex. 5 | Ex. 1 | 2 | 96 | 1 | 1 | 52.5 | 11460 | A |
| Ex. 6 | Ex. 2 | 2 | 96 | 1 | 1 | 52.6 | 9400 | A |

As shown in Table 3, the negative electrodes of Examples 5 to 6 had good binding properties because they used the resin composition of Example 1 or 2, both of which were excellent in the ability to allow lithium ions to pass through them and the ability to retain lithium ions.

Moreover, the present disclosure will be described by way of other examples, but the present disclosure is not limited to the following examples.

5. Preparation of Polymer Particle Dispersion (Examples 7 to 12 and Comparative Examples 2 to 3)

The following materials were used to prepare polymer particle dispersions of Examples 7 to 12 and Comparative Examples 2 to 3, as shown in Table 4. The abbreviations for the materials used in Table 4 and the following examples are as follows.

<Monomer (A-2)> ($R^1$ and $R^2$ Indicate the Symbols in the Formula (I))

MMA: methyl methacrylate (manufactured by Wako Pure Chemical Industries, Ltd.) ($R^1$: $CH_3$, $R^2$: $CH_3$)
EMA: ethyl methacrylate (manufactured by Wako Pure Chemical Industries, Ltd.) ($R^1$: $CH_3$, $R^2$: $C_2H_5$)
EA: ethyl acrylate (manufactured by Wako Pure Chemical Industries, Ltd.) ($R^1$: H, $R^2$: $C_2H_5$)
BA: butyl acrylate (manufactured by Wako Pure Chemical Industries, Ltd.) ($R^1$: H, $R^2$: $C_4H_9$)

<Monomer (B-2)> ($R^1$ Indicates the Symbol in the Formula (II))

MAA: methacrylic acid (manufactured by Wako Pure Chemical Industries, Ltd.) ($R^1$: $CH_3$)
AA: acrylic acid (manufactured by Wako Pure Chemical Industries, Ltd.) ($R^1$: H)

<Monomer (C)> ($R^{10}$ and X Indicate the Symbols in the Formula (IV))

EGDMA: ethylene glycol dimethacrylate (manufactured by Wako Pure Chemical Industries, Ltd.) ($R^{10}$: $CH_3$, X: O)

Polymer

SBR: styrene butadiene rubber ("BM-400B" manufactured by Zeon Corporation, solid content: 40% by mass)

Polymerization Initiator

APS: ammonium persulfate

Neutralization Salt

Na: sodium
Li: lithium

Emulsifier

AES: sodium polyoxyethylene lauryl ether sulfate ("EMAL 20C" manufactured by Kao Corporation, active component: 25% by mass)

Polymer Particle Dispersion of Example 7

In a 1 L four-necked separable glass flask were placed 74 g of MMA as a monomer (A-2), 120 g of BA and 6 g of AA as a monomer (B-2), and 340 of ion exchanged water. This solution was stirred for a predetermined time (0.5 hours) in a nitrogen atmosphere. Then, the temperature of the reaction solution in the flask was increased to about 70° C. Subsequently, a polymerization initiator solution, in which 1 g of APS was dissolved in 10 g of ion exchanged water, was added to the flask, and the reaction solution in the flask was held at about 70 to 75° C. for 6 hours. Thus, the reaction solution was polymerized and aged, resulting in a polymer particle dispersion. Thereafter, the polymer particle dispersion in the flask was cooled to room temperature and neutralized with 29.14 g of 1N NaOH aqueous solution. Then, aggregates were removed by using a 200 mesh filter cloth. The polymer particle dispersion was condensed to a concentration of about 30 to 35% by mass, so that a polymer particle dispersion of Example 7 was prepared. Table 4 shows the amounts and types of components used in the preparation of the polymer particle dispersion of Example 7.

Polymer Particle Dispersions of Examples 8 to 12

Polymer particle dispersions of Examples 8 to 12 were prepared in the same manner as Example 7 except that the monomer (A-2) and the monomer (B-2) were changed so that each polymer included constitutional units as shown in Table 4, the amount of the polymerization initiator added was changed as shown in Table 4, and the type of the neutralization salt was changed as shown in Table 4. Table 4 shows the amounts and types of components used in the preparation of the polymer particle dispersions of Examples 8 to 12.

Polymer Particle Dispersion of Comparative Example 2

A polymer particle dispersion of Comparative Example 2 was SBR.

Polymer Particle Dispersion of Comparative Example 3

A polymer particle dispersion of Comparative Example 3 was prepared in the same manner as Example 7 except that 340 g of ion exchanged water used in Example 7 was changed to 336 g of ion exchanged water and 4 g of emulsifier AES. Table 4 shows the amounts and types of components used in the preparation of the polymer particle dispersion of Comparative Example 3.

6. Physical Properties of Polymer Particles
(Examples 7 to 12 and Comparative Example 3)

Table 4 shows the results of the measurements of the average particle size of the polymer particles and the surface tension of the polymer particle dispersion in each of Examples 7 to 12 and Comparative Example 3. Table 4 also shows the polymer particle dispersions of Examples 1 to 3.

Measurement of Average Particle Size of Polymer Particles

The average particle size of the polymer particles in each of Examples 7 to 12 and Comparative Examples 2 to 3 was measured in the same manner as the polymer particles of Examples 1 to 4 and Comparative Example 1. Table 4 shows the results.

Measurement of Surface Tension

The polymer particle dispersion (which had been diluted with pure water until the solid content was 0.03% by mass) was adjusted to a temperature of 20° C. and placed in a petri dish. Then, the surface tension of the polymer particle dispersion was measured with a Wilhelmy method (in which a platinum plate was immersed in the polymer particle dispersion and pulled up at a constant speed) using a surface tension balance ("CBVP-Z" manufactured by Kyowa Interface Science Co., Ltd).

TABLE 4

| | Monomer composition of polymer | | | | | | | |
|---|---|---|---|---|---|---|---|---|
| | Monomer (A-2) | | | | | Monomer (B-2) | | Monomer (C) EGDMA mol % (with |
| | MMA mass % | EMA mass % | BMA mass % | BA mass % | EA mass % | AA mass % | MAA mass % | respect to monomer (A-2) + (B-2)) |
| Ex. 7 | 37 | — | — | 60 | — | 3 | — | — |
| Ex. 8 | 56 | — | — | 41 | — | 3 | — | — |
| Ex. 9 | 16 | — | — | 81 | — | 3 | — | — |
| Ex. 10 | 37 | — | — | — | 60 | 3 | — | — |
| Ex. 11 | — | 37 | — | 60 | — | 3 | — | — |
| Ex. 12 | 37 | — | — | 60 | — | — | 3 | — |
| Ex. 3 | — | — | — | — | 97 | 3 | — | — |
| Ex. 1 | — | — | — | — | 97 | 3 | — | 0.1 |
| Ex. 2 | — | — | — | — | 97 | 3 | — | 0.5 |
| Comp. Ex. 2 | | | | | SBR | | | |
| Comp. Ex. 3 | 37 | — | — | 60 | — | 3 | — | — |

| | Polymerization initiator | | | Polymer particle dispersion (resin composition) | |
|---|---|---|---|---|---|
| | APS mol % (with respect to monomer) | Emulsifier mass % (with respect to monomer) | Neutralization salt | Average particle size μm | Surface tension mN/m |
| Ex. 7 | 0.5 | 0 | Na | 0.33 | 72 |
| Ex. 8 | 0.5 | 0 | Na | 0.42 | 70 |
| Ex. 9 | 0.5 | 0 | Na | 0.34 | 72 |
| Ex. 10 | 0.5 | 0 | Na | 0.39 | 61 |
| Ex. 11 | 0.5 | 0 | Na | 0.32 | 71 |
| Ex. 12 | 0.5 | 0 | Na | 0.45 | 70 |
| Ex. 3 | 0.5 | 0 | Li | 0.38 | 57 |
| Ex. 1 | 0.5 | 0 | Li | 0.27 | 59 |
| Ex. 2 | 0.5 | 0 | Li | 0.30 | 60 |
| Comp. Ex. 2 | | SBR | | 0.13 | 67 |
| Comp. Ex. 3 | 0.5 | 0.5 | Na | 0.10 | 50 |

7. Production of Lithium Ion Secondary Battery
(Examples 13 to 23 and Comparative Examples 4
to 5)

A lithium ion secondary battery, which is a type of a power storage device, was produced in the following manner.

Production of Negative Electrode

In Examples 13 to 23 and Comparative Examples 4 to 5, negative electrode pastes with the compositions shown in Table 5 were prepared in the same manner as Examples 5 to 6 and used to produce negative electrodes as follows.

Production of Positive Electrode

The abbreviations for the materials of a positive electrode paste are as follows.
Positive electrode active material: NMC 111 (manufactured by NIPPON CHEMICAL INDUSTRIAL CO., LTD.), composition: $LiNi_{1/3}Mn_{1/3}Co_{1/3}O_2$ (D50: 6.5 µm, BET surface area: 0.7 $m^2/g$)
Positive electrode conductive material: acetylene black (product name: DENKA BLACK "HS-100" manufactured by Denka Company Limited)
Positive electrode binder: polyvinylidene fluoride (PVDF) ("L #7208" manufactured by KUREHA CORPORATION, 8% NMP solution)

First, 282 g of positive electrode active material, 9 g of positive electrode conductive material, and 9 g of positive electrode binder were mixed with NMP as a non-aqueous solvent, so that a positive electrode paste was adjusted. In this case, the mass ratio of the positive electrode active material, the positive electrode conductive material, and the positive electrode binder was 94:3:3 (in terms of solid content). The mixture was kneaded with a disperser. The solid content (% by mass) in the positive electrode paste was adjusted by the amount of the non-aqueous solvent. The solid content (% by mass) in the positive electrode paste means the total amount (% by mass) of solid contents of the materials, including the positive electrode active material, the positive electrode conductive material, and the positive electrode binder, contained in the positive electrode paste.

Next, the positive electrode paste thus prepared was applied to an aluminum foil (current collector) with a bar coater, and the thickness was adjusted so that the coating would be 125 $g/m^2$ after drying. Then, the coating was dried at 100° C. for 5 minutes with a forced-air drier, and further dried at 150° C. for 10 minutes. Subsequently, the coating was roll-pressed into a positive electrode mixture layer with an electrode density of 2.8 to 3.2 $g/cm^3$, which was allowed to stand at least overnight in a drying room. Thus, a positive electrode including the positive electrode mixture layer was produced.

Production of Lithium Ion Secondary Battery

Each of the negative electrodes of Examples 13 to 23 and 5 to 6 and Comparative Examples 4 to 5 was punched to a size of 45 mm×45 mm while leaving a portion to be connected to a terminal. Similarly, the positive electrode thus produced was punched to a size of 40 mm×40 mm while leaving a portion to be connected to a terminal. Then, terminals were attached to the respective electrodes.

Next, the negative electrode and the positive electrode were stacked to face each other with a separator interposed between them. The separator had been punched to a size of 50 mm×50 mm. This layered structure was sandwiched between aluminum packaging laminated films, and three sides other than the side on which the terminals were provided were heat-sealed. After an electrolyte solution was injected through the opening on the terminal side, the inside of the cell was brought into a vacuum state, and the terminal side was also heat-sealed. Thus, the cell was hermetically sealed, providing a lithium ion secondary battery. The electrolyte solution was prepared by dissolving 1 mol/L of $LiPF_6$ in a solvent containing ethylene carbonate (EC) and methyl ethyl carbonate (MEC) at a volume ratio (EC:MEC) of 3/7, and adding 1% by mass of vinylene carbonate (VC) to the solvent.

7. Measurement of Parameter (Examples 13 to 23 and Comparative Examples 4 to 5)

Measurement of Solid Content Concentration of Negative Electrode Paste and Resin Composition The solid content concentration of the negative electrode paste and the resin composition was calculated by measuring a reduction in weight after the negative electrode paste was dried at 105° C. for 24 hours. Table 5 shows the results.

Measurement of Viscosity of Negative Electrode Paste and Positive Electrode Paste The viscosities of the positive electrode paste and the negative electrode paste were measured with a B-type viscometer (temperature: 25° C., rotational speed: 6 rpm, rotor No. 3). The positive electrode paste had a viscosity of 12050 mPa·s. Table 5 shows the results of the measurement of the viscosity of the negative electrode paste.

8. Evaluation

Evaluation of Binding Properties of Negative Electrode

The negative electrode was punched to a size of 45 mm×45 mm, and then valley folded to form a triangle with the corners aligned together. At this time, the negative electrode was creased well by running a finger along the fold. Next, the negative electrode was unfolded and opened again to confirm whether the coating (negative electrode mixture layer) peeled off. If there was no peeling, the negative electrode was evaluated as "A". If there was peeling, the negative electrode was evaluated as "B". Table 5 shows the results.

Battery Characteristics

The battery characteristics were evaluated by measuring charge/discharge DCR and charge capacity under the following conditions.

Charge/Discharge DCR (Direct Current Resistance)

Using the individual lithium ion secondary batteries thus produced, DCR during charge and discharge was measured when the state of charge (SOC) of the battery was 50%. The battery was adjusted so that the SOC was 50% for each measurement in an environment of 25° C. Then, the battery was discharged (or charged) with a current of 0.2 C, 0.33 C, 1 C, 3 C, and 5 C, and the voltages 3 seconds (or 10 seconds)

after each discharge (or charge) were plotted and linearly approximated. The slope of the linear approximation was determined as a DCR. Table 5 shows the results. The smaller the DCR value, the lower the resistance and the better the battery characteristics.

Charge Capacity

Using the individual lithium ion secondary batteries thus produced, a constant current charge was performed at a current value of 1 C until the voltage reached 4.2 V in an environment of 25° C., and then a constant voltage charge was performed at 4.2 V (constant) until the current value was 0.05 C (referred to as CC/CV). Subsequently, a constant current discharge was performed on the charged battery at a current value of 1 C until the voltage was reduced to 3.0 V. The battery was charged with a constant current of 5 C until the voltage reached 4.2 V. The capacity retention rate (%) of the charge capacity at each current was determined where the charge capacity after CC/CV was set to 1. Table 5 shows the results.

charge capacity was suppressed, compared to the lithium ion secondary batteries including the negative electrodes of Comparative Examples 4 to 5. In other words, the battery characteristics of the lithium ion secondary batteries including the negative electrodes of Examples 13 to 23 and 5 to 6 were improved, compared to the lithium ion secondary batteries including the negative electrodes of Comparative Examples 4 to 5.

Further, the charge-discharge cycle characteristics of the lithium ion secondary batteries produced by using the negative electrodes of Example 13 and Comparative Example 4 were evaluated under the following conditions.

Charge-Discharge Cycle Characteristics

Using the lithium ion secondary batteries including the negative electrodes of Example 13 and Comparative Example 4, respectively, a constant current charge was performed at a current value of 1 C until the voltage reached 4.2 V in an environment of 25° C., and then a constant voltage charge was performed at 4.2 V (fixed) until the

TABLE 5

| | Negative electrode paste | | | | | | |
|---|---|---|---|---|---|---|---|
| | Resin composition (polymer particle dispersion) | | Active material | Conductive material | Thickening agent | Solid content concentration | Viscosity |
| | Type | mass % | mass % | mass % | mass % | mass % | mPa · s |
| Ex. 13 | Ex. 7 | 2 | 96 | 1 | 1 | 52.5 | 11460 |
| Ex. 14 | Ex. 8 | 2 | 96 | 1 | 1 | 51.8 | 9280 |
| Ex. 15 | Ex. 9 | 2 | 96 | 1 | 1 | 52.2 | 13140 |
| Ex. 16 | Ex. 10 | 2 | 96 | 1 | 1 | 52.6 | 9400 |
| Ex. 17 | Ex. 11 | 2 | 96 | 1 | 1 | 52.0 | 11860 |
| Ex. 18 | Ex. 12 | 2 | 96 | 1 | 1 | 52.5 | 14340 |
| Ex. 19 | Ex. 7 | 1 | 97 | 1 | 1 | 52.4 | 9760 |
| Ex. 20 | Ex. 7 | 0.5 | 97.5 | 1 | 1 | 53.9 | 10020 |
| Ex. 21 | Ex. 7 | 4 | 94 | 1 | 1 | 51.2 | 13320 |
| Ex. 22 | Ex. 12 | 1 | 97 | 1 | 1 | 52.5 | 9940 |
| Ex. 23 | Ex. 3 | 2 | 96 | 1 | 1 | 52.5 | 12030 |
| Ex. 5 | Ex. 1 | 2 | 96 | 1 | 1 | 52.5 | 11460 |
| Ex. 6 | Ex. 2 | 2 | 96 | 1 | 1 | 52.6 | 9400 |
| Comp. Ex. 4 | Comp. Ex. 2 | 2 | 96 | 1 | 1 | 52.5 | 12940 |
| Comp. Ex. 5 | Comp. Ex. 3 | 2 | 96 | 1 | 1 | 51.4 | 13000 |

| | | DCR (mΩ) (SOC50%) | | | | Charge capacity |
|---|---|---|---|---|---|---|
| | Binding | Discharge | | Charge | | Retention rate (%) |
| | property | 3 sec | 10 sec | 3 sec | 10 sec | 5 C |
| Ex. 13 | A | 1280.5 | 1522.6 | 1288.5 | 1495.5 | 74.9 |
| Ex. 14 | A | 1317.5 | 1551.7 | 1322.8 | 1531.3 | 73.8 |
| Ex. 15 | A | 1294.1 | 1529.0 | 1313.6 | 1504.8 | 74.7 |
| Ex. 16 | A | 1344.1 | 1596.3 | 1375.0 | 1581.4 | 72.8 |
| Ex. 17 | A | 1305.5 | 1545.8 | 1325.3 | 1521.4 | 74.3 |
| Ex. 18 | A | 1325.3 | 1555.7 | 1338.6 | 1543.8 | 74.1 |
| Ex. 19 | A | 1311.2 | 1555.9 | 1337.0 | 1531.4 | 74.0 |
| Ex. 20 | A | 1329.8 | 1571.1 | 1353.1 | 1549.7 | 73.7 |
| Ex. 21 | A | 1329.8 | 1562.7 | 1331.2 | 1534.8 | 75.4 |
| Ex. 22 | A | 1331.2 | 1564.4 | 1350.1 | 1551.4 | 73.8 |
| Ex. 23 | A | 1296.4 | 1530.5 | 1308.9 | 1525.2 | 73.1 |
| Ex. 5 | A | 1285.3 | 1519.2 | 1296.4 | 1510.2 | 74.2 |
| Ex. 6 | A | 1273.4 | 1512.2 | 1285.3 | 1503.4 | 76.5 |
| Comp. Ex. 4 | A | 1429.9 | 1682.1 | 1461.2 | 1664.6 | 67.5 |
| Comp. Ex. 5 | B | 1487.1 | 1757.8 | 1510.9 | 1744.5 | 62.1 |

As shown in Table 5, the negative electrodes of Examples 13 to 23 and 5 to 6 and Comparative Examples 4 had good binding properties. Moreover, as shown in Table 5, the resistance of the lithium ion secondary batteries including the negative electrodes of Examples 13 to 23 and 5 to 6 was reduced, and thus a decrease in the retention rate of the current value was 0.05 C. Subsequently, a constant current discharge was performed on the charged battery at a current value of 3 C until the voltage was reduced to 3.0 V. Defining this series of operations as a cycle, each of the batteries was repeatedly charged and discharged in 1000 cycles. The ratio of the discharge capacity after each cycle to the discharge capacity in the first cycle was calculated as a capacity retention rate (%). FIG. 1 shows the results.

As shown in FIG. 1, the lithium ion secondary battery including the negative electrode of Example 13 had a high capacity retention rate in the charge and discharge cycles at room temperature, and thus achieved excellent charge-discharge cycle characteristics, compared to the lithium ion secondary battery including the negative electrode of Comparative Example 4.

INDUSTRIAL APPLICABILITY

As described above, the resin composition of the present disclosure has excellent ion permeability while ensuring good binding properties with an electrode, and is useful for a lithium ion battery, a lithium ion capacitor, and other power storage devices.

The invention claimed is:

1. A resin composition for an electrode of a power storage device, comprising:
    polymer particles contain a constitutional unit (A-2) derived from a compound expressed by the following formula (I) and a constitutional unit (B-2) derived from at least one compound selected from a group consisting of a compound expressed by the following formula (II), a compound expressed by the following formula (III), and an unsaturated dibasic acid,
    wherein a content of the constitutional unit (A-2) in all constitutional units of the polymer particles is 50% by mass or more and 99.9% by mass or less,
    a content of the constitutional unit (B-2) in all constitutional units of the polymer particles is 0.1% by mass or more and 20% by mass or less,
    wherein the mass ratio (A-2/B-2) of the constitutional unit (A-2) to the constitutional unit (B-2) is 5 or more and 50 or less,
    wherein the content of the surfactant is 0.05% by mass or less with respect to the total solid content of the resin composition, and
    a surface tension of the resin composition is 55 mN/m or more,

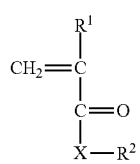

(I)

in the formula (I), $R^1$ represents a hydrogen atom or a methyl group; $R^2$ represents at least one selected from a linear or branched alkyl group having 1 to 6 carbon atoms and $-CH_2OR^3$; $R^3$ represents a linear or branched alkyl group having 4 to 6 carbon atoms; and X represents —O— or —NH—,

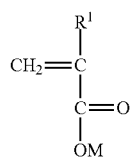

(II)

in the formula (II), $R^1$ represents a hydrogen atom or a methyl group; and M represents a hydrogen atom or a cation,

in the formula (III), $R^1$ represents a hydrogen atom or a methyl group; X represents —O— or —NH—; $R^4$ represents at least one selected from $-(CH_2)_nOH$, $-R^6N(R^7)(R^8)$, and $-R^6N^+(R^7)(R^8)(R^9).Y^-$; n represents 1 or more and 4 or less; $R^6$ represents a linear or branched alkylene group having 1 to 4 carbon atoms; $R^7$ and $R^8$ are the same or different and represent a linear or branched alkyl group having 1 to 3 carbon atoms; $R^9$ represents a linear or branched alkyl group having 1 to 3 carbon atoms; and $Y^-$ represents an anion.

2. The resin composition according to claim 1, wherein a total content of the constitutional unit (A-2) and the constitutional unit (B-2) in all constitutional units of the polymer particles is 80% by mass or more.

3. The resin composition according to claim 1, wherein in the formula (I), $R^1$ represents a hydrogen atom, $R^2$ represents a linear or branched alkyl group having 1 to 6 carbon atoms, and X represents —O—, and
    wherein the constitutional unit (B-2) is derived from the compound expressed by the formula (II), and in the formula (II), $R^1$ represents a hydrogen atom or a methyl group and M represents a hydrogen atom or a cation.

4. The resin composition according to claim 1, wherein the polymer particles contain a constitutional unit (C) derived from a polyfunctional monomer (C), and
    a content of the constitutional unit (C) in the polymer particles is 0.001 mol % or more and 1 mol % or less with respect to a total number of moles of the constitutional unit (A-2) and the constitutional unit (B-2).

5. The resin composition according to claim 1, wherein an average particle size of the polymer particles is 0.1 μm or more and less than 0.7 μm.

6. The resin composition according to claim 1, further comprising an aqueous medium,
    wherein the resin composition is in the form of a polymer particle dispersion in which the polymer particles are dispersed in the aqueous medium.

7. The resin composition according to claim 1, serving as a binder for a positive electrode or a negative electrode.

8. A method for producing a resin composition for an electrode of a power storage device, the resin composition comprising polymer particles,
    the method comprising:
    a polymerization step of polymerizing a monomer mixture containing a monomer (A-2) and a monomer (B-2) to form polymer particles,
    wherein the monomer (A-2) is a compound expressed by the following formula (I),
    the monomer (B-2) is at least one compound selected from the group consisting of a compound expressed by the following formula (II), a compound expressed by the following formula (III), and an unsaturated dibasic acid, an amount of the monomer (A-2) used in the polymerization step is 50% by mass or more and 99.9% by mass or less with respect to a total amount of monomers, an amount of the monomer (B-2) used in the polymerization step is 0.1% by mass or more and 20% by mass or less with respect to the total amount of monomers, wherein the mass ratio (A-2/B-2) of the constitutional unit (A-2) to the constitutional unit (B-2) is 5 or more and 50 or less, and an amount of a surfactant used in the polymerization step is 0.05% by mass or less with respect to the total amount of monomers,

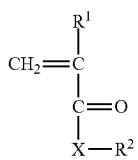
(I)

in the formula (I), $R^1$ represents a hydrogen atom or a methyl group; $R^2$ represents at least one selected from a linear or branched alkyl group having 1 to 6 carbon atoms and —$CH_2OR^3$; $R^3$ represents a linear or branched alkyl group having 4 to 6 carbon atoms; and X represents —O— or —NH—,

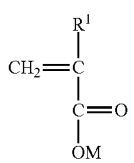
(II)

in the formula (II), $R^1$ represents a hydrogen atom or a methyl group; and M represents a hydrogen atom or a cation,

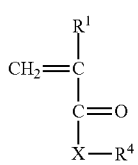
(III)

in the formula (III), $R^1$ represents a hydrogen atom or a methyl group; X represents —O— or —NH—; $R^4$ represents at least one selected from —$(CH_2)_nOH$, —$R^6N(R^7)(R^8)$, and —$R^6N^+(R^7)(R^8)(R^9).Y^-$; n represents 1 or more and 4 or less; $R^6$ represents a linear or branched alkylene group having 1 to 4 carbon atoms; $R^7$ and $R^8$ are the same or different and represent a linear or branched alkyl group having 1 to 3 carbon atoms; $R^9$ represents a linear or branched alkyl group having 1 to 3 carbon atoms; and $Y^-$ represents an anion.

9. The method according to claim 8, wherein the monomer mixture further contains a polyfunctional monomer (C), and an amount of the polyfunctional monomer (C) used in the polymerization step is 0.001 mol % or more and 1 mol % or less with respect to a total number of moles of the monomer (A-2) and the monomer (B-1) that are used in polymerization.

10. An electrode for a power storage device, comprising:
a current collector; and
a mixture layer provided on the current collector,
wherein the mixture layer includes an active material and the resin composition according to claim 1.

11. A resin composition for an electrode of a power storage device, comprising:
polymer particles contain a constitutional unit (A-2) derived from a compound expressed by the following formula (I) and a constitutional unit (B-2) derived from at least one compound selected from a group consisting of a compound expressed by the following formula (II), a compound expressed by the following formula (III), and an unsaturated dibasic acid, wherein the polymer particles are obtained by emulsion polymerization of a monomer mixture containing a compound expressed by the formula (I), at least one compound selected from a compound expressed by the formula (II), a compound expressed by the formula (III), and unsaturated dibasic acid, wherein the amount of an emulsifier used in the emulsion polymerization is 0.05% by mass or less with respect to the total solid content of the resin composition, a content of the constitutional unit (A-2) in all constitutional units of the polymer particles is 50% by mass or more and 99.9% by mass or less, a content of the constitutional unit (B-2) in all constitutional units of the polymer particles is 0.1% by mass or more and 20% by mass or less, wherein the mass ratio (A-2/B-2) of the constitutional unit (A-2) to the constitutional unit (B-2) is 5 or more and 50 or less, and a surface tension of the resin composition is 55 mN/m or more,

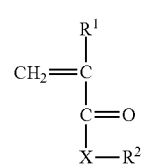
(I)

in the formula (I), $R^1$ represents a hydrogen atom or a methyl group; $R^2$ represents at least one selected from a linear or branched alkyl group having 1 to 6 carbon atoms and —$CH_2OR^3$; $R^3$ represents a linear or branched alkyl group having 4 to 6 carbon atoms; and X represents —O— or —NH—,

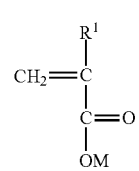
(II)

in the formula (II), $R^1$ represents a hydrogen atom or a methyl group; and M represents a hydrogen atom or a cation,

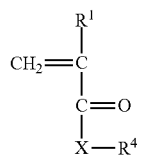

(III)

in the formula (III), $R^1$ represents a hydrogen atom or a methyl group; X represents —O— or —NH—; $R^4$ represents at least one selected from —$(CH_2)_n$OH, —$R^6N(R^7)(R^8)$, and —$R^6N^+(R^7)(R^8)(R^9) \cdot Y^-$; n represents 1 or more and 4 or less; $R^6$ represents a linear or branched alkylene group having 1 to 4 carbon atoms; $R^7$ and $R^8$ are the same or different and represent a linear or branched alkyl group having 1 to 3 carbon atoms; $R^9$ represents a linear or branched alkyl group having 1 to 3 carbon atoms; and $Y^-$ represents an anion.

* * * * *